US012036178B2

(12) United States Patent
Perrin et al.

(10) Patent No.: US 12,036,178 B2
(45) Date of Patent: *Jul. 16, 2024

(54) COMBINATION EMERGENCY WASH AND FAUCET UNIT

(71) Applicant: Bradley Fixtures Corporation, Menomonee Falls, WI (US)

(72) Inventors: Timothy E. Perrin, Hartford, CT (US); Ryan Pfund, Slinger, WI (US); Theodore E. Dhein, Sussex, WI (US)

(73) Assignee: Bradley Fixtures, LLC, Menomonee Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,916

(22) Filed: Apr. 18, 2023

(65) Prior Publication Data

US 2023/0248612 A1 Aug. 10, 2023

Related U.S. Application Data

(63) Continuation of application No. 16/867,008, filed on May 5, 2020, now Pat. No. 11,642,278.

(51) Int. Cl.
*A61H 35/02* (2006.01)
*A61H 35/00* (2006.01)
(Continued)

(52) U.S. Cl.
CPC ........... *A61H 35/02* (2013.01); *A61H 35/008* (2013.01); *B05B 1/1636* (2013.01);
(Continued)

(58) Field of Classification Search
CPC .... A61H 35/02; A61H 35/008; B05B 1/1636; E03C 1/0404; E03C 1/086; E03C 2001/0414; E03C 2201/30
(Continued)

(56) References Cited

U.S. PATENT DOCUMENTS 1,079,441 A 11/1913 Roethlisberger
1,354,838 A 10/1920 Perkins
(Continued)

FOREIGN PATENT DOCUMENTS

CA 178659 12/2018
EM 004541399-0001 1/2018
(Continued)

OTHER PUBLICATIONS

Bradley Eyewash Station, announced Date unavailable [online], [site visited Jul. 15, 2020]. Available from internet, URL:<https://www.scnindustrial.com/product/bradley-eyewash-station-s19274hw-sei778> (Year: 2020).
(Continued)

*Primary Examiner* — Tuan N Nguyen
(74) *Attorney, Agent, or Firm* — Boyle Fredrickson, S.C.

(57) ABSTRACT

A combination emergency wash and faucet unit includes a base, an emergency wash arm pivotally coupled to the base, and a spout pivotally coupled to the base. The emergency wash arm includes an emergency wash unit. The emergency wash arm is rotatable relative to the base about a first vertical axis between a stored position and an active position. The spout is rotatable relative to the base about a second vertical axis. The first vertical axis is substantially parallel to the second vertical axis and offset from the second vertical axis. Movement of the emergency wash arm causes a corresponding movement of the spout.

20 Claims, 28 Drawing Sheets

(51) Int. Cl.
*B05B 1/16* (2006.01)
*E03C 1/04* (2006.01)
*E03C 1/086* (2006.01)

(52) U.S. Cl.
CPC ............ *E03C 1/0404* (2013.01); *E03C 1/086* (2013.01); *E03C 2001/0414* (2013.01); *E03C 2201/30* (2013.01)

(58) Field of Classification Search
USPC ............... 4/601, 620; 239/579, 581.1, 587.5, 239/587.6, 538
See application file for complete search history.

(56) References Cited

U.S. PATENT DOCUMENTS

| | | | |
|---|---|---|---|
| 1,524,484 A | | 1/1925 | Lutz |
| 2,635,006 A | | 4/1953 | Richmond |
| 2,999,249 A | | 9/1961 | Logan et al. |
| 3,079,088 A | | 9/1961 | Hermann et al. |
| 3,925,829 A | | 12/1975 | Bost |
| 4,257,560 A | | 3/1981 | Diamond |
| 4,675,924 A | | 6/1987 | Allison et al. |
| 4,688,276 A | | 8/1987 | Allison et al. |
| 4,901,927 A | | 2/1990 | Valdivia |
| 4,975,993 A | | 12/1990 | Black et al. |
| D330,071 S | | 10/1992 | Zerlia |
| 5,170,518 A | | 12/1992 | Warriner |
| 5,265,288 A | | 11/1993 | Allison |
| D368,302 S | | 3/1996 | Doughty et al. |
| 5,530,972 A | | 7/1996 | Tanner |
| D373,815 S | | 9/1996 | Chaney |
| 5,740,569 A | | 4/1998 | Gurries et al. |
| D437,394 S | | 2/2001 | Mark et al. |
| D439,953 S | | 4/2001 | Lord |
| 6,227,456 B1 | | 5/2001 | Colman |
| 6,256,808 B1 | | 7/2001 | Graham et al. |
| 6,385,794 B1 | | 5/2002 | Miedzius et al. |
| D461,880 S | | 8/2002 | Underbrink |
| D465,831 S | | 11/2002 | Otero et al. |
| D466,589 S | | 12/2002 | Miedzius |
| 6,520,431 B2 | | 2/2003 | Donovan |
| 6,611,972 B2 | | 9/2003 | Underbrink et al. |
| 6,782,568 B2 | | 8/2004 | Novak et al. |
| D519,613 S | | 4/2006 | Spangler |
| 7,159,252 B2 | | 1/2007 | Underbrink et al. |
| D543,827 S | | 6/2007 | Citterio |
| 7,240,854 B2 | | 7/2007 | Taylor |
| 7,305,722 B2 | | 12/2007 | Sha et al. |
| 7,552,747 B1 | | 6/2009 | Sargsyan |
| 7,997,513 B2 | | 8/2011 | Chen et al. |
| D662,219 S | | 6/2012 | Perrin et al. |
| D662,220 S | | 6/2012 | Perrin et al. |
| D662,605 S | | 6/2012 | Perrin et al. |
| D671,228 S | | 11/2012 | Perrin et al. |
| D673,298 S | | 12/2012 | Perrin et al. |
| D685,920 S | | 7/2013 | Perrin et al. |
| D706,399 S | | 6/2014 | Yang et al. |
| D754,297 S | | 4/2016 | Garland |
| 9,314,398 B2 | | 4/2016 | Perrin et al. |
| 9,492,348 B2 | | 11/2016 | Novak et al. |
| 9,700,484 B2 | | 7/2017 | Perrin et al. |
| 9,855,189 B2 | | 1/2018 | Eveleigh et al. |
| 9,868,125 B2 | | 1/2018 | Macsay |
| 9,943,193 B2 | | 4/2018 | Stanley |
| D833,601 S | | 11/2018 | Massie et al. |
| 10,213,058 B2 | | 2/2019 | Eveleigh et al. |
| D853,528 S | | 7/2019 | Eads et al. |
| 10,342,389 B2 | | 7/2019 | Eveleigh et al. |
| D865,124 S | | 10/2019 | Carpiaux et al. |
| D865,126 S | | 10/2019 | Zeng |
| D875,888 S | | 2/2020 | Carpiaux et al. |
| D886,952 S | | 6/2020 | Carpiaux et al. |
| 10,807,106 B2 | | 10/2020 | Buhler et al. |
| 10,881,253 B2 | | 1/2021 | Eveleigh et al. |
| D912,214 S | | 3/2021 | Perrin et al. |
| D914,151 S | | 3/2021 | Perrin et al. |
| 11,642,278 B2 | * | 5/2023 | Perrin .................. E03C 1/0404 4/620 |
| 2002/0175226 A1 | | 11/2002 | Donovan |
| 2009/0276954 A1 | | 11/2009 | Davidson |
| 2012/0096639 A1 | | 4/2012 | Stanley et al. |
| 2013/0283522 A1 | * | 10/2013 | Novak .................. E03C 1/0404 4/678 |
| 2018/0353376 A1 | | 12/2018 | Perrin et al. |
| 2019/0368173 A1 | | 12/2019 | Chung |
| 2019/0390446 A1 | | 12/2019 | Mooren et al. |
| 2020/0248438 A1 | | 8/2020 | Wang et al. |
| 2021/0062733 A1 | | 3/2021 | Miwa et al. |
| 2021/0076879 A1 | | 3/2021 | Eveleigh et al. |

FOREIGN PATENT DOCUMENTS

| | | |
|---|---|---|
| EM | 004541399-0007 | 1/2018 |
| WO | WO-2008/067879 A1 | 6/2008 |

OTHER PUBLICATIONS

Eyewash Faucet, Combination Emergency Eyewash and Gooseneck Faucet, Chicago Faucets, CF2124 11/19, Copyright 2019, available at https://www.chicagofaucets.com/sites/default/files/2020-02/CF2124.pdf, 2pps.
International Search Report and Written Opinion for International Application No. PCT/US2018/036933, dated Nov. 23, 2018, 23 pages.
Non-Final Office Action on U.S. Appl. No. 16/867,008 dated Sep. 1, 2022.
Notice of Allowance on U.S. Appl. No. 16/867,008 dated Jan. 4, 2023.
Speakman Eyewash-Faucets, website http://speakman.com/emergency-equipment/eyewash-faucet, 2017, 2 pages.
U.S. Notice of Allowance on U.S. Appl. No. 29/607,253, dated Jul. 3, 2019, 6 pages.
U.S. Office Action on U.S. Appl. No. 29/607,253, dated Mar. 2, 2018, 6 pages.

* cited by examiner

COMBINATION EMERGENCY WASH AND FAUCET UNIT

CROSS-REFERENCE TO RELATED PATENT APPLICATION

This application is a continuation of U.S. application Ser. No. 16/867,008, filed on May 5, 2020, the entire disclosure of which is hereby incorporated by reference herein.

TECHNICAL FIELD

The present disclosure relates generally to plumbing fixtures. More specifically, the present disclosure relates to faucets and emergency wash units.

BACKGROUND

Emergency wash units include emergency eyewash units, emergency facewash/eyewash units, and a combination of these systems. Emergency eyewash or emergency facewash units are designed to provide fluid, such as water, to a focused region of a person such as their eyes and/or face. Emergency wash units are conventionally installed above a sink or basin to manage the drainage of fluid expelled by the systems and any contaminants washed away from a user of the system. In some cases, these sinks include faucets capable of providing a fluid, such as water, to wash the hands or arms of a person or other objects or to fill vessels such as buckets, pots, or beakers. These faucets can supply water at various temperatures and flow rates.

SUMMARY

At least one embodiment relates to a combination emergency wash and faucet unit. The unit includes a base, an emergency wash arm pivotally coupled to the base, and a spout pivotally coupled to the base. The emergency wash arm includes an emergency wash unit that is rotatable relative to the base about a first vertical axis. The spout is rotatable relative to the base about a second vertical axis. The first vertical axis is offset from the second vertical axis.

Another embodiment relates to a combination emergency wash and faucet unit. The unit includes a base defining a first stop surface, an emergency wash arm pivotally coupled to the base, a spout pivotally coupled to the base and rotatable relative to the base about an axis, a rotation control member rotationally coupled to the emergency wash arm, the rotation control member defining a second stop surface, and a stop protrusion coupled to the spout. The emergency wash arm includes an emergency wash unit and is repositionable between a stored position and an active position. The stop protrusion is configured to (a) limit rotation of the spout in a first direction when engaging the first stop surface and (b) limit rotation of the spout in a second direction when engaging the second stop surface. Rotation of the emergency wash arm between the stored position and the active position causes a corresponding movement of the second stop surface relative to the first stop surface.

Another embodiment relates to a combination emergency wash and faucet unit. The unit includes a base including a main body configured to be coupled to a sink and a hub pivotally coupled to the main body, the hub defining a surface. An emergency wash arm is coupled to the hub, the emergency wash arm including an emergency wash unit configured to dispense a first fluid. The emergency wash arm is repositionable between an active position and a stored position. A spout is coupled to the main body and configured to dispense a second fluid. A first valve assembly is coupled to the main body and includes a valve element that is repositionable between (a) a sealed position in which the first valve assembly prevents or substantially prevents the second fluid from being dispensed from the spout and (b) an open position in which the first valve assembly permits the second fluid to be dispensed from the spout. The first valve assembly engages the surface such that surface moves the valve element from the open position to the sealed position when the emergency wash arm is moved from the stored position to the active position This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
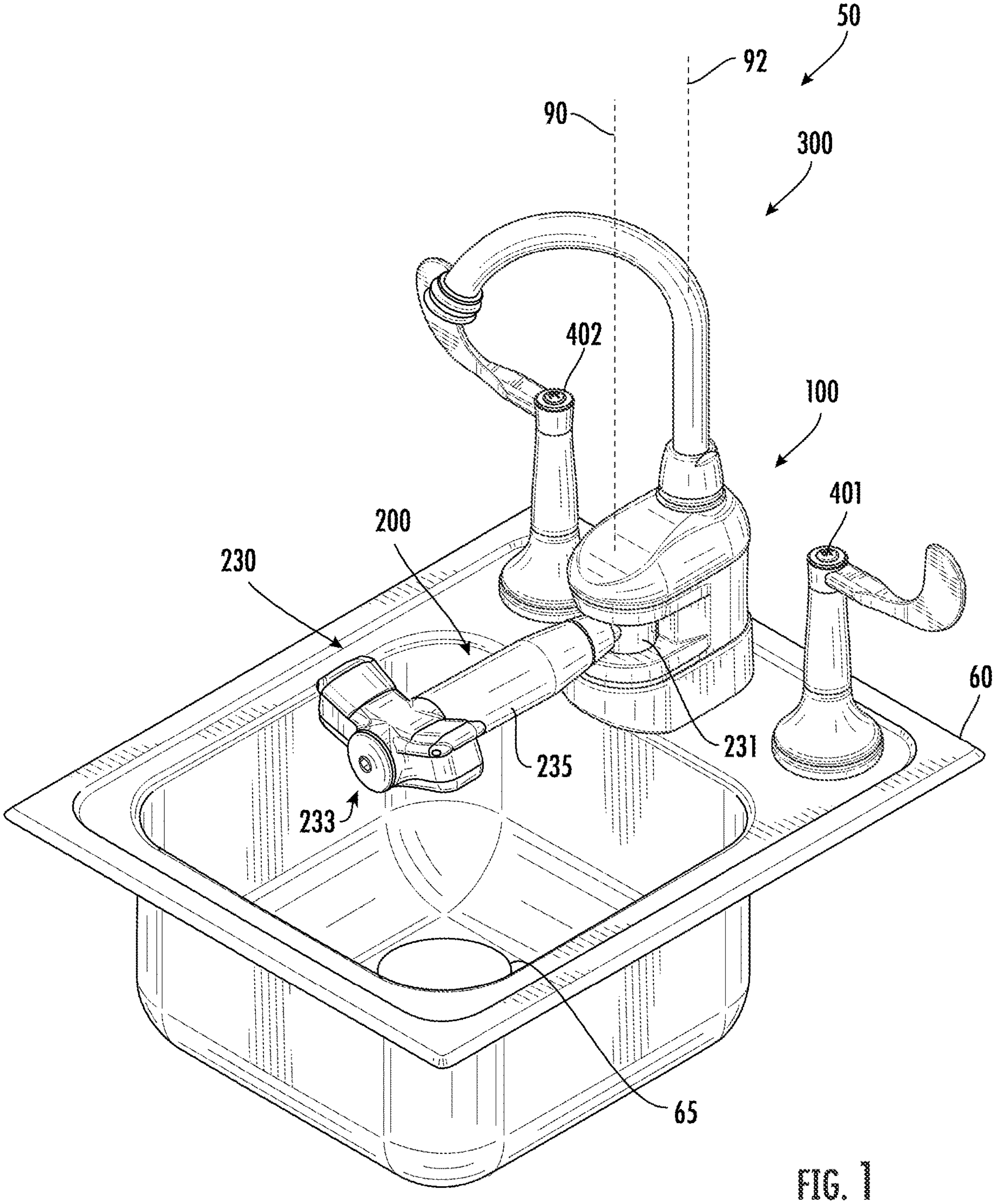
FIG. 1 is a front, right perspective view of a combination emergency wash and faucet system with the emergency wash in an active position, according to an exemplary embodiment.
Figure 2:
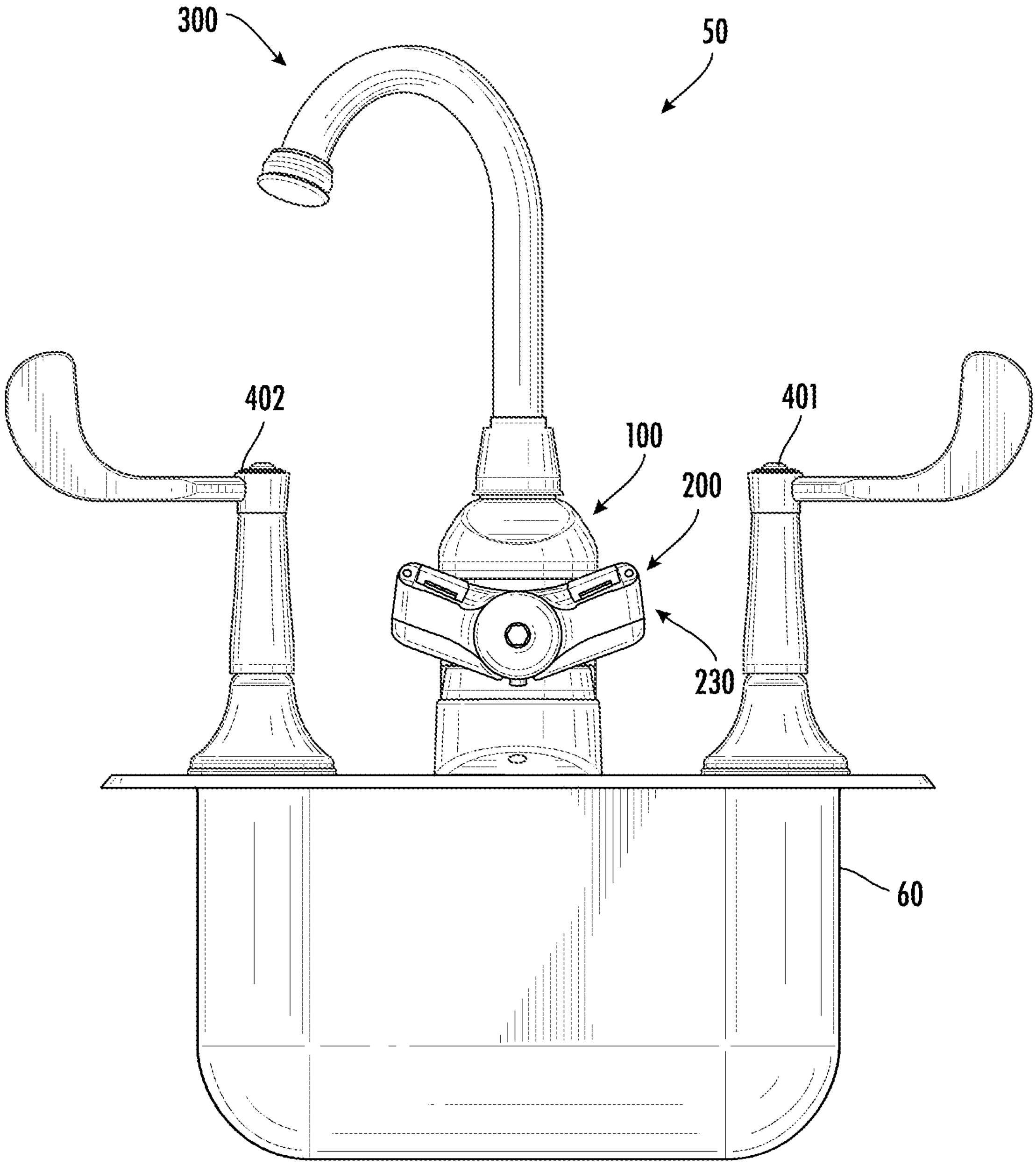
FIG. 2 is a front view of the combination emergency wash and faucet system of FIG. 1.
Figure 3:
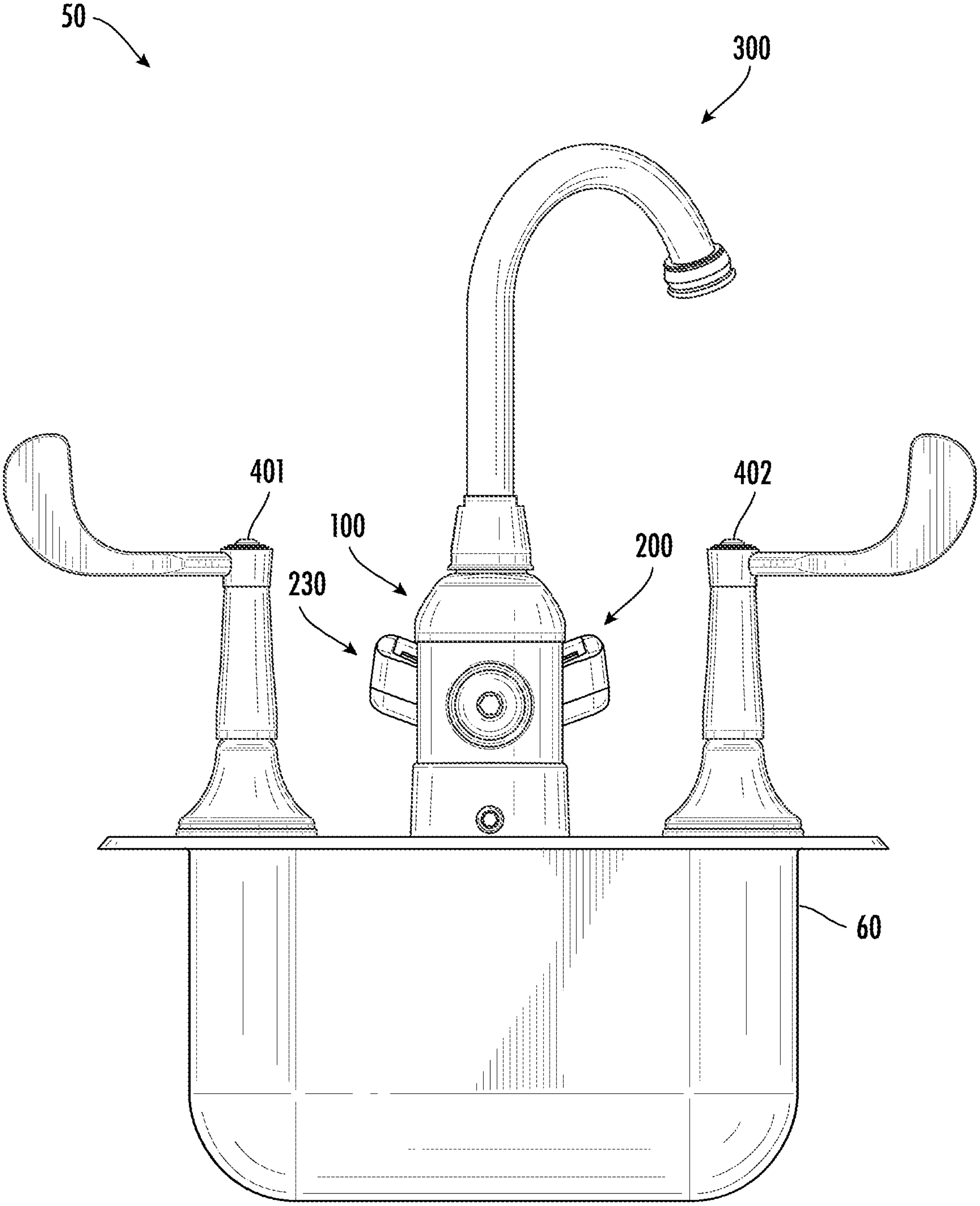
FIG. 3 is a rear view of the combination emergency wash and faucet system of FIG. 1.
Figure 4:
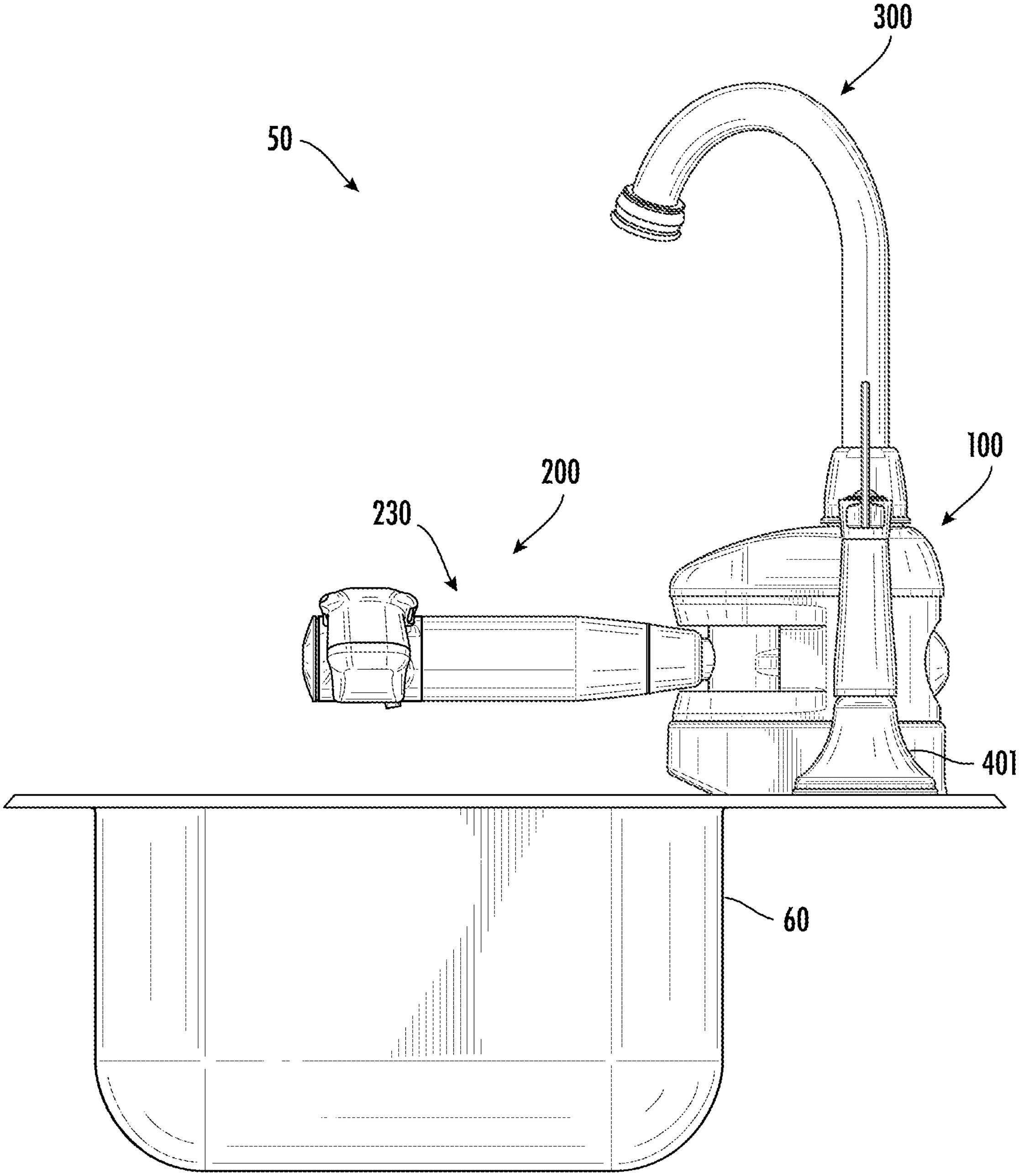
FIG. 4 is a right side view of the combination emergency wash and faucet system of FIG. 1.
Figure 5:
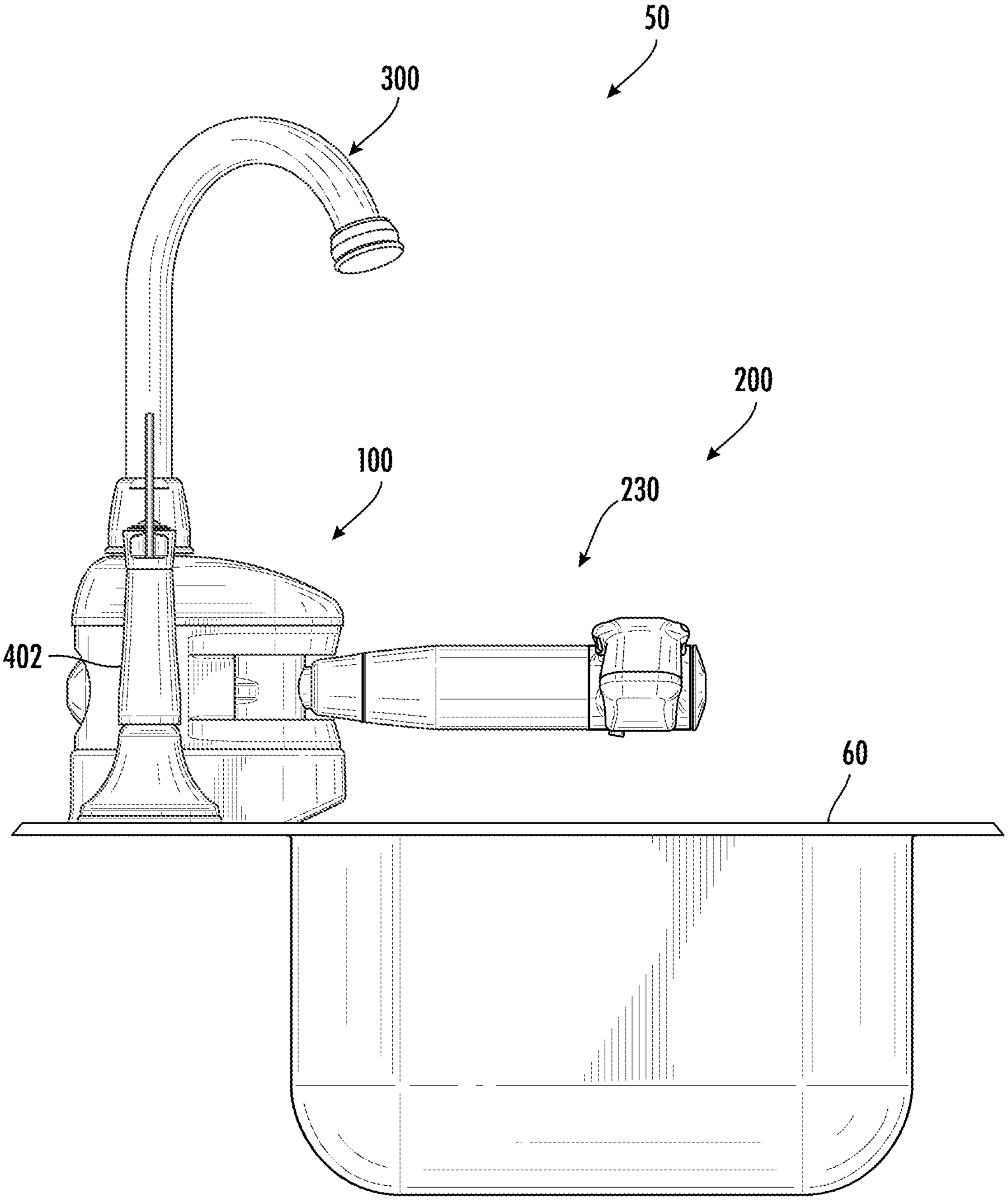
FIG. 5 is a left side view of the combination emergency wash and faucet system of FIG. 1.
Figure 6:
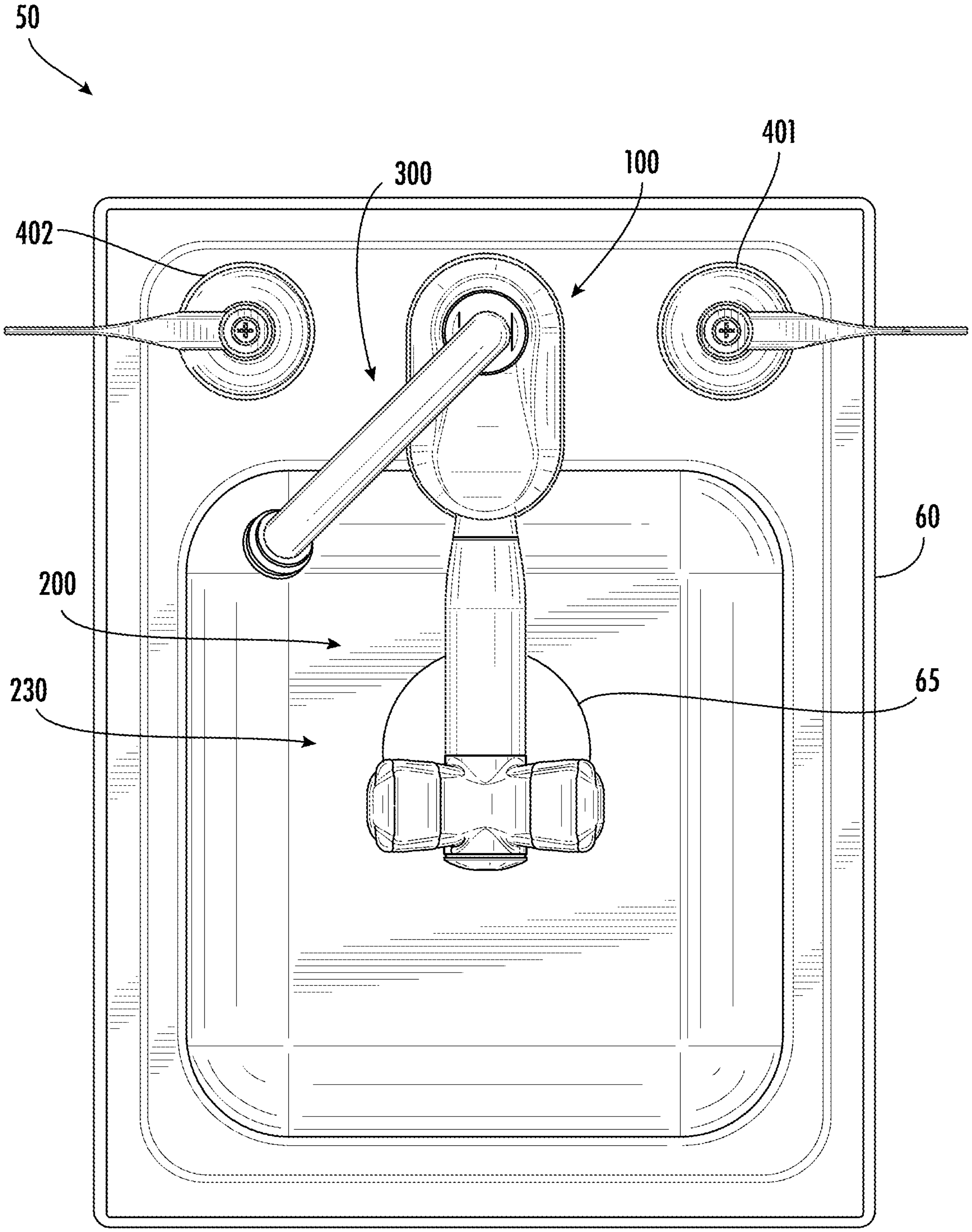
FIG. 6 is a top view of the combination emergency wash and faucet system of FIG. 1.

Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

As used herein, the term “emergency wash fixture” or “emergency wash unit” means an eyewash, a facewash, or combination eyewash/facewash. Therefore and although certain embodiments presented herein are described as including an eyewash that directs streams of water towards the eyes of a person, it should be understood that the eyewash may be replaced with a facewash or a combination eyewash/facewash that directs water to a larger area of the face.

As used herein, the term “valve” means a device, assembly, or system that controls the flow of a fluid by opening, closing, or partially obstructing fluid communication paths. A “valve” may be actuated by a hydraulic system, a pneumatic system, manually (i.e., by hand), a solenoid, a motor, or other means. Furthermore, a “valve” may include/be structured as different types of valves including, but not limited to, a ball, butterfly, choke, diaphragm, gate, globe, knife, needle, pinch, piston, plug, solenoid, spool, or any other type of valve. Therefore and although certain embodiments presented herein are described as including a particular type of valve with a specific actuation path, it should be understood that the particular valve and actuation combination may be replaced by other types of valve and actuation combinations in other embodiments.

Emergency wash units are conventionally installed above a sink or basin to manage the drainage of fluid expelled by the systems and any contaminants washed away from a user of the system. In some cases, these sinks include faucets capable of providing a fluid. The faucets are typically centrally located on the sink, while the emergency wash units are located off to the side of the sink, separate from the faucet(s). This placement of the emergency wash unit is beneficial, as it prevents the emergency wash unit from obstructing the normal use of the faucet. However, this placement brings a number of disadvantages. When using the emergency wash unit, the person moves their head above an outlet of the eyewash and/or facewash. However, the faucet may interfere with the placement of the user’s head especially if the vision of the person is impaired due to the presence of contaminants in their eyes. When the eyewash and/or facewash is moved over the sink, the outlets of the emergency wash unit remain offset toward the side of the sink, increasing the potential for water from the emergency wash unit to spray beyond the boundaries of the sink. Further, the eyewash and/or facewash takes up a significant amount of space along the perimeter of the sink. Additionally, this placement requires one or more additional holes through a support surface surrounding the sink to facilitate routing of hoses to the emergency wash unit.

Referring generally to the Figures, various embodiments disclosed herein relate to a combination emergency wash and faucet unit, system, or fixture. According to the present disclosure, the fixture includes both an emergency wash arm and a faucet (e.g., a spout assembly). The faucet dispenses water for routine washing or filling tasks, such as washing one’s hands or filling a container with water. Water dispensed from the faucet may have a variable temperature or flow rate controlled by a user. The emergency wash arm is configured to be activated in an emergency or other desired situation to spray water towards a person to wash a substance from their eyes or face. Water dispensed from the emergency wash arm is lukewarm or tepid (e.g., between 50° F. and 110° F.) and directed towards the eyes or face of a person. In one embodiment and as primarily described herein, the emergency wash arm and the faucet are configured to be used alternately such that the emergency wash arm and the faucet are not activated at the same time.

The fixture includes a faucet having a spout, a base, and the emergency wash arm, which includes an emergency wash unit. The emergency wash arm and the spout are each pivotally coupled to the base. The base is fixed relative to (e.g., fixedly coupled to) a sink. When using the faucet, the spout is rotated to an active position over the sink, and the emergency wash arm is rotated to an inactive or stored position away from the active position of the spout. When the faucet is in use, the water flow rate and temperature are controlled by the user (e.g., by interacting with one or more valves, sensors, etc.). To use the emergency wash arm, the user applies a force to rotate or otherwise move the emergency wash arm to the active position over the sink.

The fixture includes a coupling mechanism (e.g., a gear train) that rotationally couples the emergency wash arm to the spout in certain positions. When the emergency wash arm is in a stored position, the spout may be free to rotate without causing a corresponding rotation of the emergency wash arm. Rotation of the emergency wash arm from the stored position to the active position causes the spout to move or rotate concurrently and in the same direction to a stored position. Similarly, when the spout is rotated by the user from a stored position to an active position, the emergency wash arm is driven to rotate in the same direction from the active position towards the stored position. In some embodiments, the stored position angle of the spout (e.g., the angle between the stored position of the spout and a central position) is different than the stored position angle of the emergency wash arm. The stored position of the inactive device (e.g., either the faucet spout or the emergency wash arm) is located away from the active device advantageously providing the user access to the active device without interference from the inactive device.

In one configuration, the spout of the combination emergency wash and faucet system is positioned to the left of the emergency wash arm when in the stored position (i.e., the combination emergency wash and faucet system is configured for use with a right hand of a user, referred to herein as a right-handed configuration). In another configuration, the spout is positioned to the right of the emergency wash arm when in the stored position (i.e., the combination emergency wash and faucet system is configured for use with a left hand of a user, referred to herein as a left-handed configuration). The fixture can be easily reconfigured between the right-handed configuration and the left-handed configuration without requiring any additional parts.

The combination emergency wash and faucet system may include two valve control handles (e.g., a user interface) configured to control the flow rate and temperature of a fluid (e.g., water) when the faucet is in use. In this arrangement, one handle may control the hot fluid flow rate, and the other handle may control the cold fluid flow rate. The hot fluid and the cold fluid are then combined and directed to an inlet of the spout. In a different embodiment, the fluid flow rate and temperature of the fluid expelled from the spout are controlled by a single valve control handle. The single valve control handle may be on the right side or the left side of the base. In this arrangement, the hot fluid mixes with the cold fluid in a single valve controlled by the single valve control handle. The fluid mixture is then directed to the inlet of the spout. In yet other embodiments, hot and cold fluid are mixed to achieve a predetermined temperature (e.g., by a thermostatic mixing valve), and the user controls only the on/off state of the fluid and/or the flow rate of the mixed fluid. The fluid flow may be controlled by a variety of different types of user interfaces (e.g., hand-activated handles, knee-activated buttons or paddles, foot-activated pedals, etc.). By way of example, a valve may be controlled by a button or a sensor that detects the presence or movement of an operator's hands (e.g., an infrared time of flight sensor, a capacitive sensor, etc.). Such a user interface may, when activated, initiate a flow at a predetermined temperature and flow rate for a predetermined period of time.

Flow of fluid through the emergency wash arm and the spout may be controlled based on the position of the emergency wash arm. Specifically, the fixture includes a first valve assembly that selectively prevents flow through the spout and a second valve assembly that selectively prevents flow through the emergency wash arm. When the emergency wash arm is in the stored position, the first valve permits flow through the spout, and the second valve prevents flow through the emergency wash arm. When the emergency wash arm is in the active position, the first valve prevents flow through the spout, and the second valve permits flow through the emergency wash arm. Accordingly, when the emergency wash arm is moved to the active position, flow through the spout is automatically shut off, and flow through the emergency wash arm is automatically activated.

Referring now to FIGS. 1-8, a combination emergency wash and faucet system, combination emergency wash and faucet unit, or fixture is shown as fixture 50 according to an exemplary embodiment. The fixture 50 is coupled to a basin or sink 60. The sink 60 may be a standalone unit (e.g., supported by legs) or may be supported by another support structure, such as a countertop. The sink 60 is configured to collect a fluid and has a drain 65 for draining the fluid. The sink 60 may be a kitchen sink, a laboratory sink, or another type of water receptacle. Thus, the fixture 50 may be used in a variety of settings from residential (e.g., kitchens) to commercial and lab settings.

The fixture 50 includes a main body, fixed portion, or base assembly, which is shown as base 100 coupled to the sink 60. In some embodiments, the base 100 is directly coupled to the sink 60. In other embodiments, the base 100 is indirectly coupled to the sink 60 (e.g., through a countertop). The fixture 50 further includes emergency wash assembly, shown as emergency wash arm 200, pivotally coupled to the base 100. The emergency wash arm 200 is configured to supply a first fluid (e.g., tepid or lukewarm water) in an upward direction (e.g., toward the face and/or eyes of a user). In some embodiments, the temperature and/or flow rate of the first fluid is predetermined and/or preset (e.g., as required by one or more standards). By way of example, the temperature of the first fluid may be set by a thermostatic mixing valve. The fixture 50 further includes a faucet or spout section or assembly, shown as spout assembly 300, pivotally coupled to the base 100. The spout assembly 300 is configured to dispense a second fluid (e.g., water). Thus, the base 100 is an intermediary between spout assembly 300 and the wash arm 200.

Figure 7:
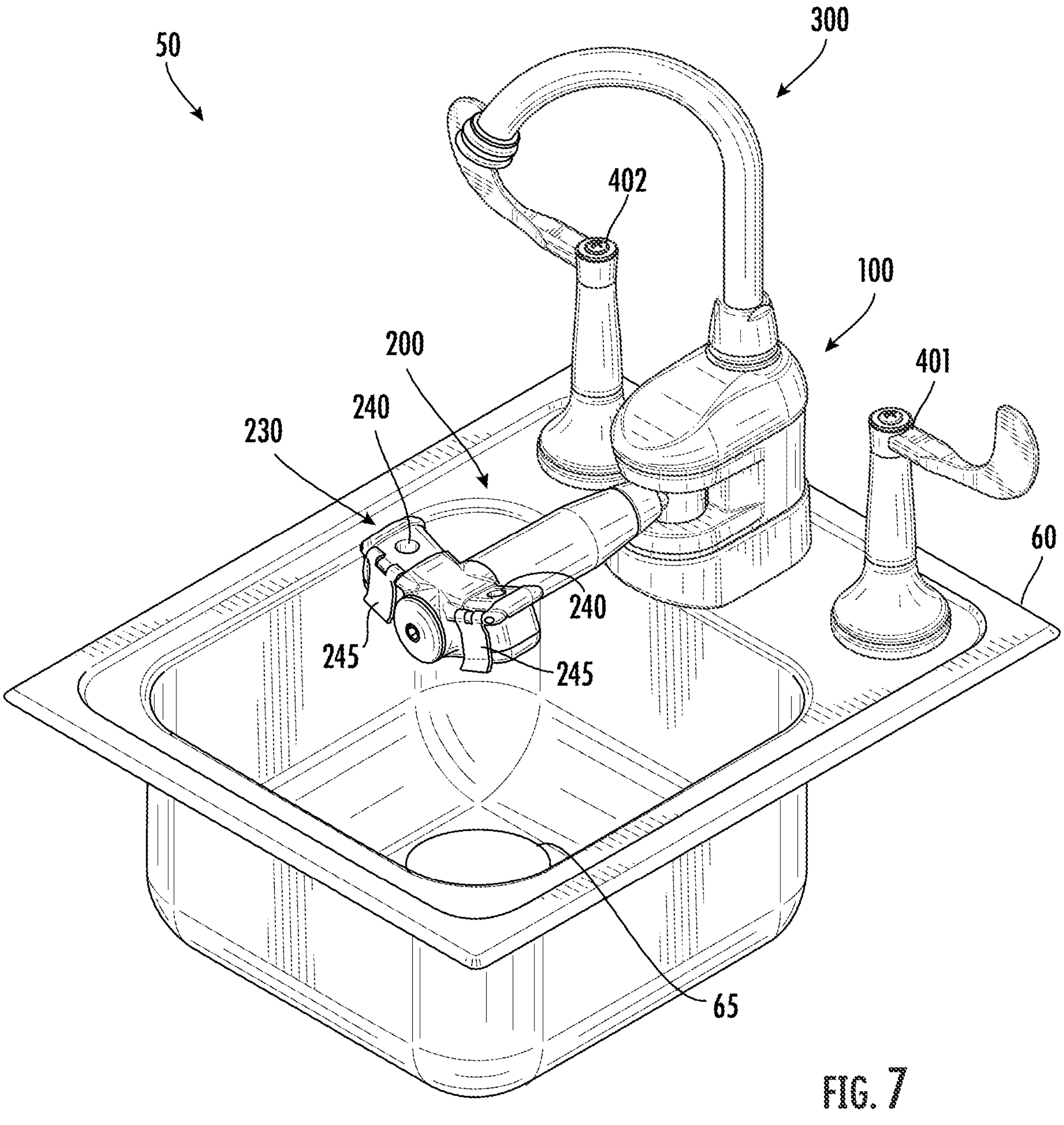
FIG. 7 is a front, right perspective view of the combination emergency wash and faucet system of FIG. 1.

Referring particularly to FIGS. 1 and 7, the emergency wash arm 200 extends from a proximal end 231, which is coupled to the base 100, to a distal end 233. The emergency wash arm 200 includes an emergency wash unit, shown as eyewash 230, positioned at the distal end 233 of the emergency wash arm 200. A member, shown as connecting pipe 235, extends between and couples the eyewash 230 to the base 100. The eyewash 230 is configured to dispense the first fluid (e.g., tepid water) into the eyes and/or face of a user. The eyewash 230 defines a pair of outlets, shown as apertures 240, that each direct a spray of water upwards and inwards to where the eyes of a person using the eyewash 230 would be located. In some embodiments, the eyewash 230 includes a pair of flaps or covers 245 that cover the apertures 240 when the eyewash 230 is not in use (e.g., as shown in FIG. 1). The covers 245 may be pivotally coupled to a body of the eyewash 230 such that the covers 245 rotate away from the spray when the eyewash 230 is in use (e.g., to the positions shown in FIG. 7). The covers 245 prevent dust or other debris from settling in the apertures 240 over time. Although FIGS. 1 and 7 illustrate the covers 245 as being closed and opened, respectively, with the emergency wash arm 200 in the active position, it should be understood that the covers 245 may normally remain closed unless water flows out of the apertures 240.

In the embodiment shown in FIGS. 1-6, two user interfaces or valve controllers, shown as cold water handle 401 and hot water handle 402, control the flow rate and temperature of the second fluid expelled from the spout assembly 300. Specifically, the cold water handle 401 includes a valve that controls a flow rate of cold water to the spout assembly 300, and the hot water handle 402 includes a valve that controls a flow rate of hot water to the spout assembly 300. Hot water and cold water may mix in the spout assembly 300, such that mixed water exits the spout assembly 300. As shown, the handles 401, 402 are positioned on opposite sides of the base 100. Specifically, the handles 401, 402 are positioned such that, when a user is facing the fixture 50, the cold water handle 401 is positioned to the right of the base 100 and the hot water handle 402 is positioned to the left of the base 100.

In an alterative embodiment, the flow rate and/or temperature of the fluid expelled from the spout assembly 300 may be electronically controlled (e.g., turned on based on a sensor detecting a presence of a user). In such embodiments, the cold water handle 401 and the hot water handle 402 may be omitted. By way of example, the fixture 50 may include a motion sensor (e.g., an infrared sensor, an ultrasonic sensor, etc.) that detects motion (e.g., movement of a user's hands) and/or the presence of an object (e.g., a user's hands) nearby the fixture 50 (e.g., over the sink 60) and initiates a flow of fluid to the spout assembly 300 in response to such a motion or presence. By way of another example, the fixture 50 may include a touch sensor (e.g., a button, a capacitive sensor, etc.) that detects when a user contacts a predetermined location (e.g., a surface of the spout assembly 300) and initiates a flow of fluid to the spout assembly 300 in response to such a contact. In such examples, a controller coupled to the sensor(s) may control operation of an electronic valve based on an input from the sensor. The controller may initiate the flow for a predetermined period of time, at a predetermined flow rate, and/or at a predetermined temperature.

The emergency wash arm 200 is rotatable relative to the base 100 about a first vertical axis, shown as vertical axis 90. The emergency wash arm 200 may rotate within a horizontal plane. The spout assembly 300 is rotatable relative to the base 100 about a second vertical axis, shown as vertical axis 92. The vertical axis 90 is positioned closer to the user (e.g., closer to the center of the sink 60) than the vertical axis 92. In other words, a distance between a user and the vertical axis 90 is less than a distance between the user and the vertical axis 92. In other embodiments, the emergency wash arm 200 has a different range of movement relative to the base 100. By way of example, the emergency wash arm 200 may rotate about a horizontal axis or about an axis that is between horizontal and vertical (e.g., at 45 degrees relative to a vertical axis).

Figure 8:
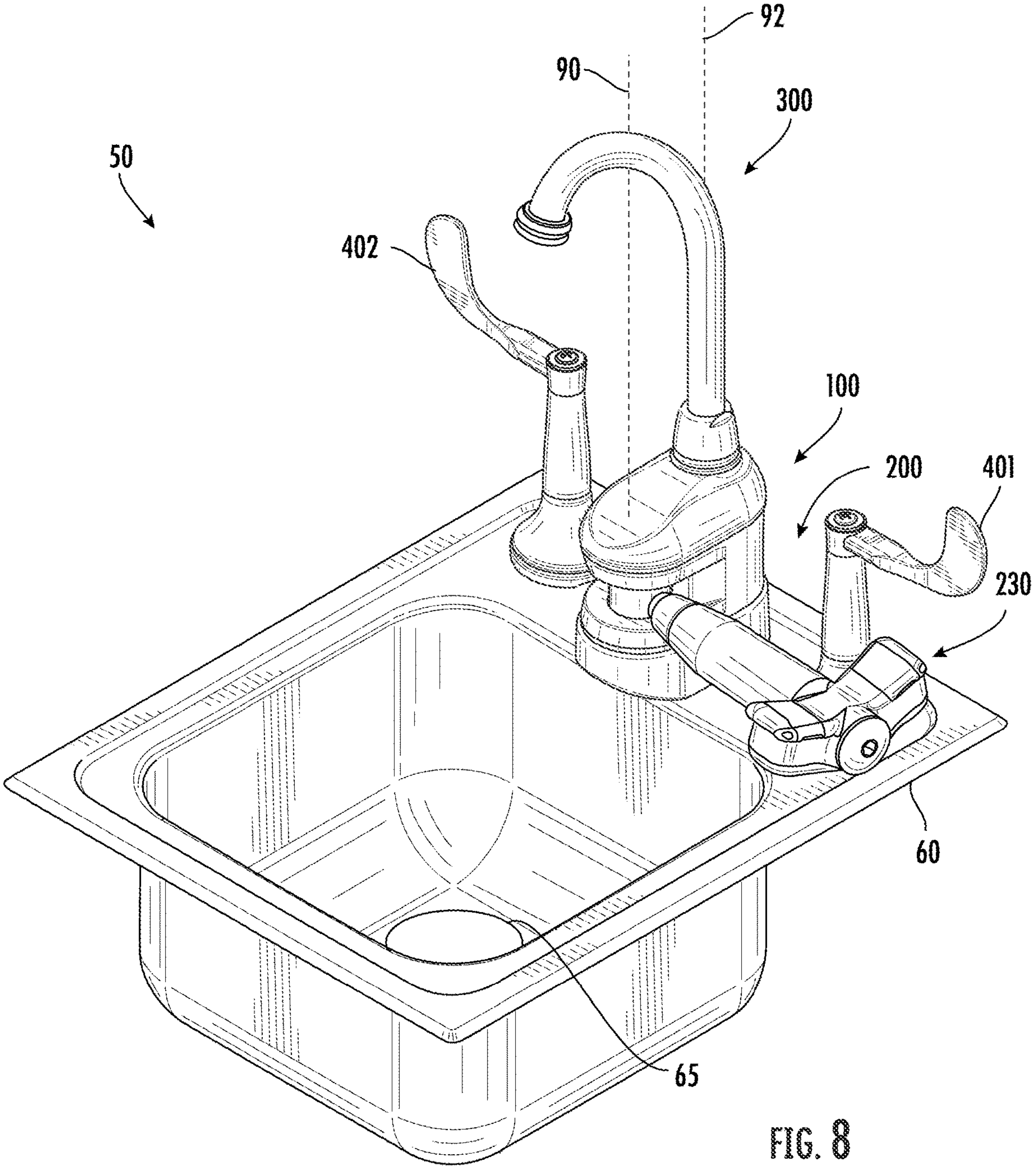
FIG. 8 is a front, right perspective view of the combination emergency wash and faucet system of FIG. 1 with the emergency wash in a stored position.

The emergency wash arm 200 is selectively repositionable (e.g., in response to a manual input by a user, such as grabbing and pulling the emergency wash arm 200) between an active or use position and an inactive, stowed away, or stored position. In the active position of the emergency wash arm 200 (e.g., as shown in FIG. 1), the emergency wash arm 200 extends forward from the base 100 over the sink 60. In the stored position (e.g., as shown in FIG. 8), the emergency wash arm 200 is rotated away from the active position, toward the back of the sink 60. The emergency wash arm 200 extends laterally, minimizing interference with normal use of the sink (e.g., use of the handles 401, 402, insertion of items into the sink 60, operation of the spout assembly 300, etc.). Accordingly, movement of the emergency wash arm 200 is limited to predefined range (e.g., a predetermined amount of movement). Specifically, the emergency wash arm 200 is limited to rotate through a predefined rotational range. As shown, the active position of the emergency wash arm 200 is offset approximately 90° from the stored position of the emergency wash arm 200 (i.e., the rotational range is approximately 90°). In other embodiments, the active position of the emergency wash arm 200 is offset a different angle from the stored position of the emergency wash arm 200 (e.g., 120°, 60°, 45°, etc.). This predefined rotational range may change positions when fixture 50 changes between a right-handed configuration and a left-handed configuration. In some embodiments and as shown, the predefined rotational range in the right-handed configuration and the predefined rotational range in the left-handed configuration are symmetrical about a central plane of the fixture 50.

The spout assembly 300 is selectively repositionable (e.g., in response to a manual input by a user, such as grabbing and pulling the spout assembly 300) throughout a range of active or use positions (e.g., as shown in FIG. 7). The range may be approximately centered about a central active position (e.g., aligned with the active position of the emergency wash arm 200, oriented straight toward the user, aligned with a central plane of the fixture 50, etc.). Accordingly, movement of the spout assembly 300 is limited to predefined range (e.g., a predetermined amount of movement). Specifically, the spout assembly 300 is limited to rotate through a predefined rotational range. In some embodiments and as shown, the range has a width of approximately 90°. In other embodiments, the range has a different width (e.g., 200°, 180°, 120°, etc.). As shown in FIG. 1, the spout assembly 300 is repositionable into an inactive, stowed away, or stored position. The stored position may be located to the side of (e.g., at an end of) the range of active positions. In the stored position, the spout assembly 300 is rotated away from the active position of the emergency wash arm 200, toward the back of the sink 60. The spout assembly 300 extends at least partially laterally, minimizing interference with use of the emergency wash arm 200 (e.g., minimizing interference between a user's head and the spout assembly 300 when the user's head is placed above the emergency wash arm 200). As shown, the active position of the emergency wash arm 200 is offset approximately 45° from the stored position of the spout assembly 300.

In some embodiments, the base 100 is configured to control relative movement of the emergency wash arm 200 and the spout assembly 300. By way of example, when the emergency wash arm 200 is in the stored position, the spout assembly 300 may be free to rotate throughout the range of active positions. When the emergency wash arm 200 is in the active position, the spout assembly 300 may be limited to the stored position. In this configuration, the emergency wash arm 200 and the spout assembly 300 may be separated by a predefined or predetermined angle, separation amount, or separation distance (e.g., an angle measured about a vertical axis). In some embodiments, this angle is an acute angle (e.g., between 0° and 90°). In some such embodiments, this angle is between 30° and 60°. In one particular embodiment and as shown, this angle is approximately 45°. In other embodiments, the angle is larger than 90°. Thus, when the emergency wash arm 200 is in the active position, the spout assembly 300 is in the stored position, which is shown as being offset 45° from the emergency wash arm 200. In other embodiments, the base 100 controls movement of the spout assembly 300 such that the spout assembly 300 is offset from the emergency wash arm 200 by at least this angle when the emergency wash arm 200 is in the active position (i.e., the spout 300 is free to rotate farther away from emergency wash arm 200). When the emergency wash arm 200 is moved from the stored position to the active position, components of the base 100 may be configured to control movement of the spout 300 such that the spout 300 moves from any initial position throughout the range of active positions toward the stored position. Accordingly, the spout 300 may be configured to end up in the same stored position regardless of if the spout 300 were initially in the active position closest to the stored position of the emergency wash arm 200 or in an active position near the stored position of the spout 300.

In some embodiments, the base 100 includes one or more valve assemblies configured to control the flow rate of fluid through the emergency wash arm 200 and/or the spout assembly 300. In some embodiments, the flow rate of the first fluid through the emergency wash arm 200 and the flow rate of the second fluid through the spout assembly 300 are controlled based on the position of the emergency wash arm 200. By way of example, when the emergency wash arm 200 is in the stored position, the base 100 may prevent flow through the emergency wash arm 200 and permit flow through the spout assembly 300 (e.g., as controlled by the handles 401, 402). When the emergency wash arm 200 is moved to the active position, the base 100 can restrict (e.g., cut off) flow through the spout assembly 300 and permit (e.g., activate) flow through the emergency wash arm 200).

Figure 9A:
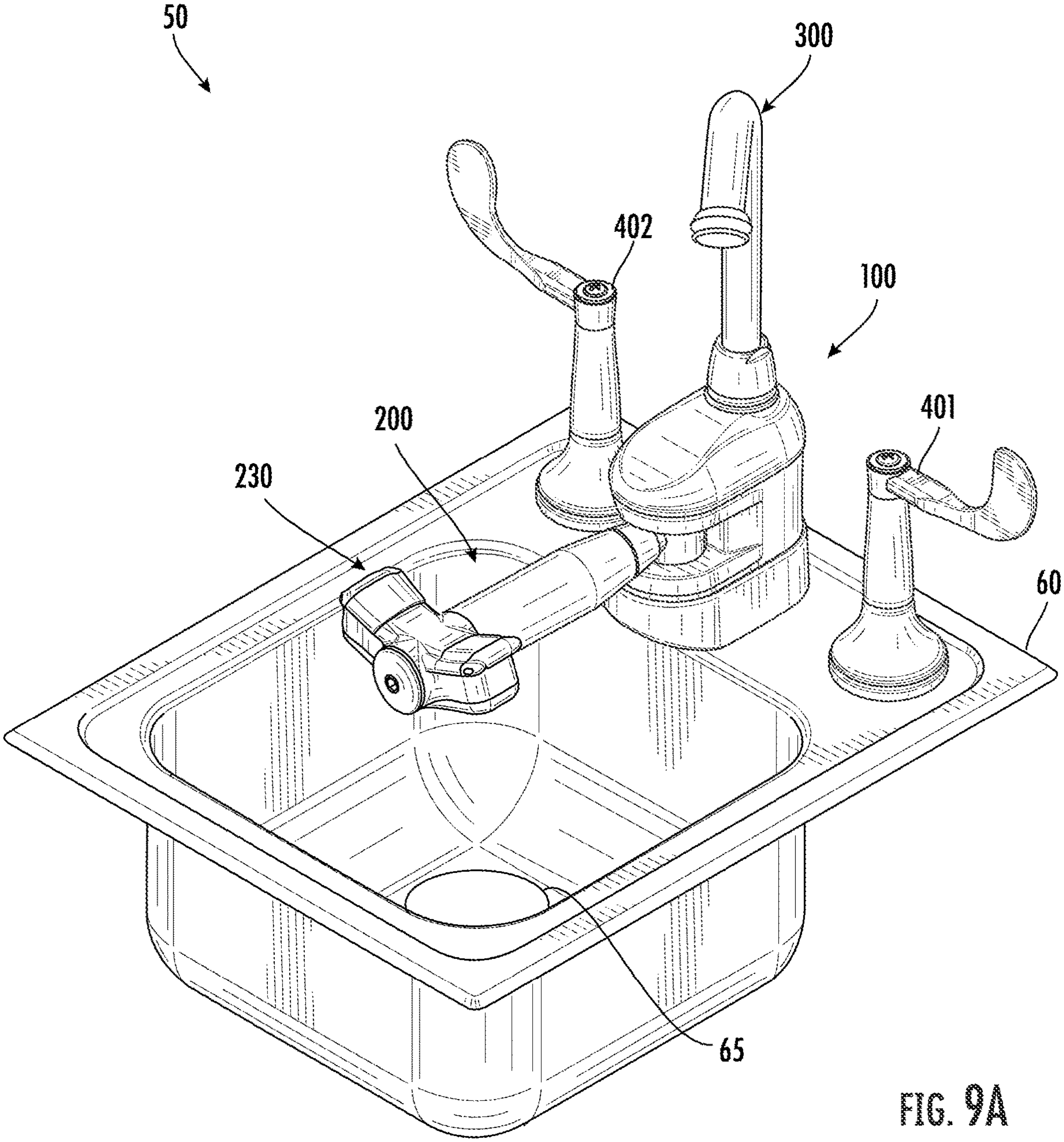
FIG. 9A is a front, right perspective view of the combination emergency wash and faucet system in a left-handed configuration with the emergency wash in an active position.
Figure 9B:
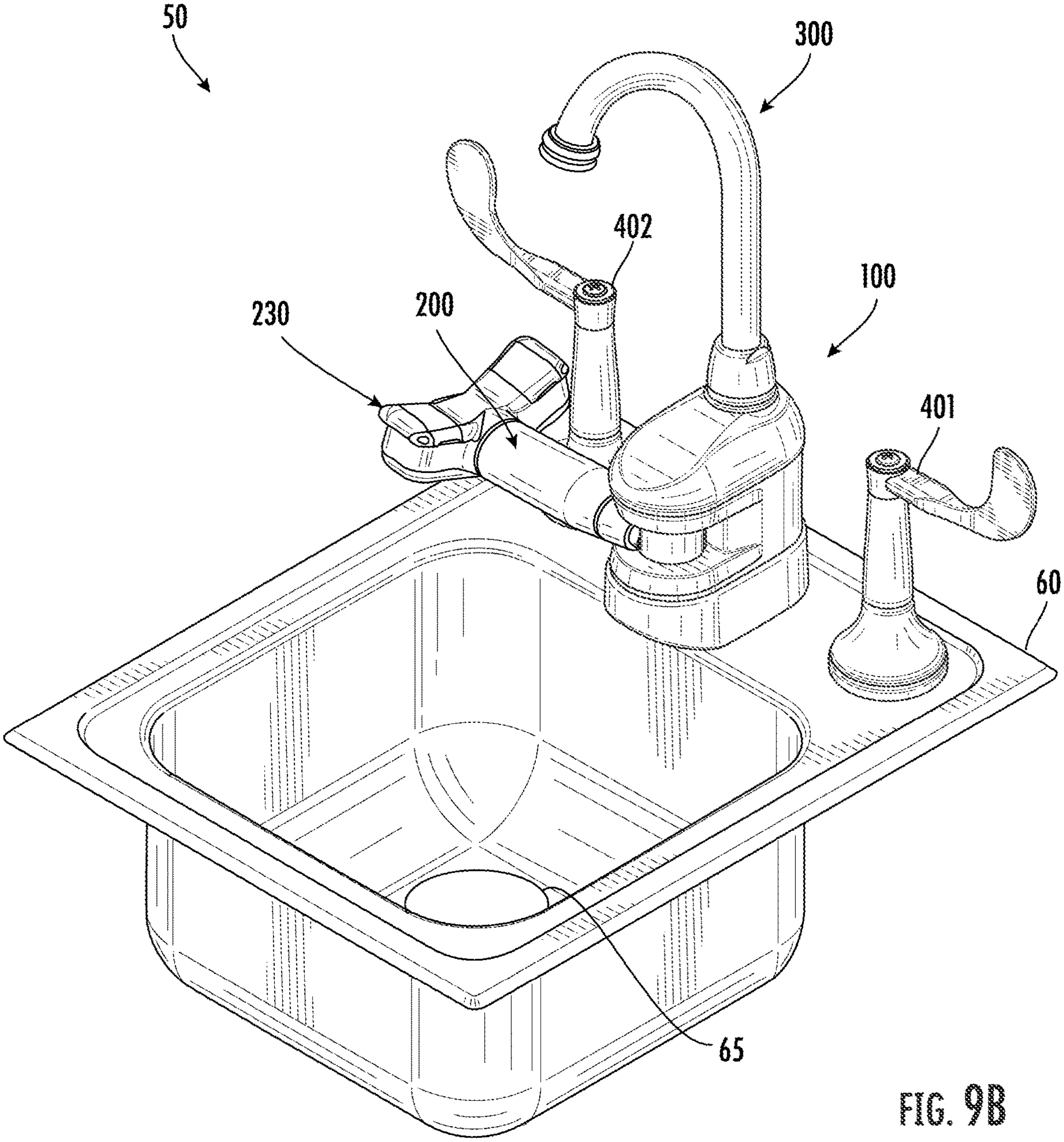
FIG. 9B is a front, right perspective view of the combination emergency wash and faucet system in a left-handed configuration with the emergency wash in a stored position.

As shown in FIGS. 1-8, the fixture 50 is configured in a right-handed configuration. In a right-handed configuration, the user may rotate the emergency wash arm 200 to the active position using their right hand while the user is facing the fixture 50 (e.g., by pulling the emergency wash arm 200). In such embodiments, the emergency wash arm 200 may always be positioned to the right (e.g., counter-clockwise as viewed from above) of the spout assembly 300. Referring to FIGS. 9A and 9B, an alternative embodiment of the fixture 50 is shown. In this embodiment, the fixture 50 has a left-handed configuration. Specifically, the spout assembly 300 is shown positioned (e.g., angled) to the right of the emergency wash arm 200. FIG. 9A shows the emergency wash arm 200 in the active position, and FIG. 9B shows the emergency wash arm 200 in the stored position. Accordingly, the emergency wash arm 200 may have a first stored position in the right-handed configuration (e.g., as shown in FIG. 8) and a second stored position in the left-handed configuration (e.g., as shown in FIG. 9B. The first stored position may be offset approximately 180° from the second stored position.

Figure 10A:
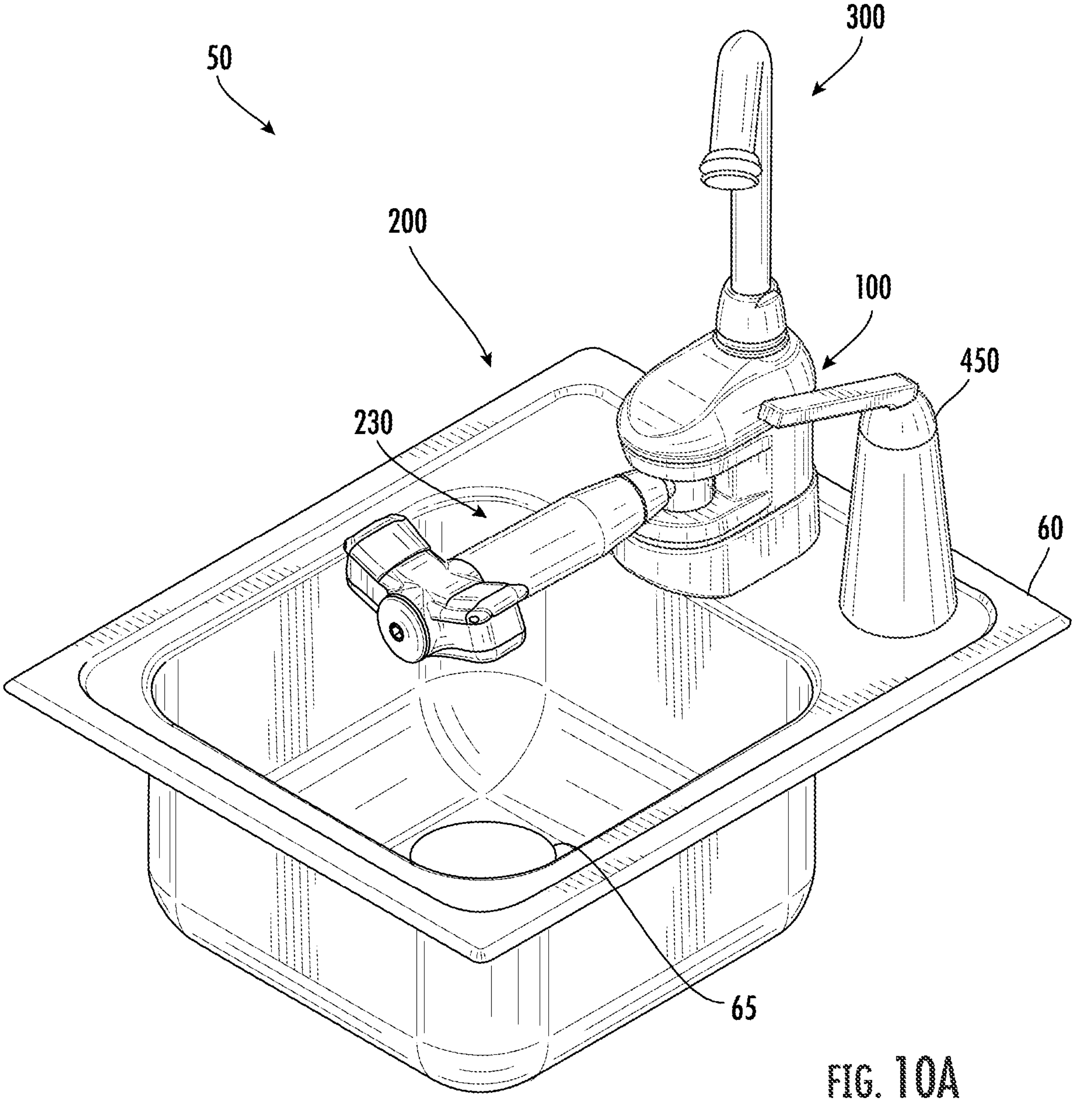
FIG. 10A is a front, right perspective view of a combination emergency wash and faucet system in a left-handed configuration, according to an exemplary embodiment.
Figure 10B:
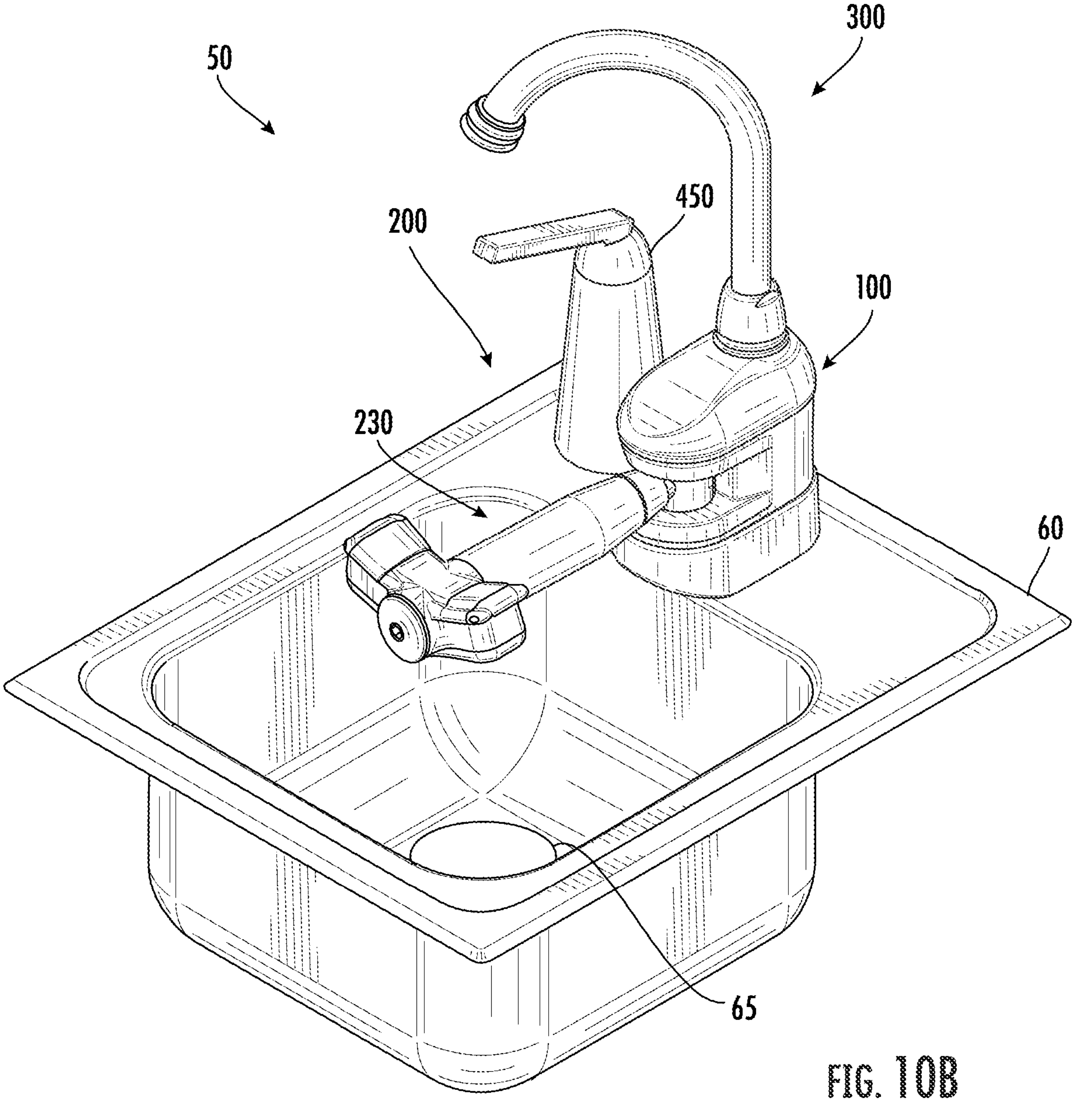
FIG. 10B is a front, right perspective view of a combination emergency wash and faucet system in a right-handed configuration, according to an exemplary embodiment.

Referring to FIGS. 10A and 10B, alternative embodiments of the fixture 50 are shown. In these embodiments, the handles 401, 402 are replaced with a user interface or valve controller, shown as mixed water handle 450. The mixed water handle 450 is configured to control a flow rate and temperature of a fluid (e.g., water) expelled from the spout assembly 300. The mixed water handle 450 is configured to operate a valve that controls the flow of mixed hot and cold water from the spout assembly 300. As shown in FIG. 10A, the mixed water handle 450 is positioned to the right of the base 100, and the fixture 50 has a left-handed configuration. As shown in FIG. 10B, the mixed water handle 450 is positioned to the left of the base 100, and the fixture 50 has a right-handed configuration. In other embodiments, the mixed water handle 450 is positioned elsewhere relative to the base 100. The handles 401, 402 or the mixed water handle 450 may be utilized with any embodiment of the emergency wash and fixture 50 described herein. In yet other embodiments, the mixed water handle 450 is omitted, and the temperature and/or flow rate of the second fluid through the spout assembly 300 is otherwise controlled. By way of example, the temperature of the second fluid may be controlled by a thermostatic mixing valve. By way of example, the flow through the spout assembly 300 may be controlled by an infrared sensor (e.g., activating the flow at a predetermined flow rate for a predetermined time period in response to an object moving within a threshold distance of the sensor).

Figure 11:
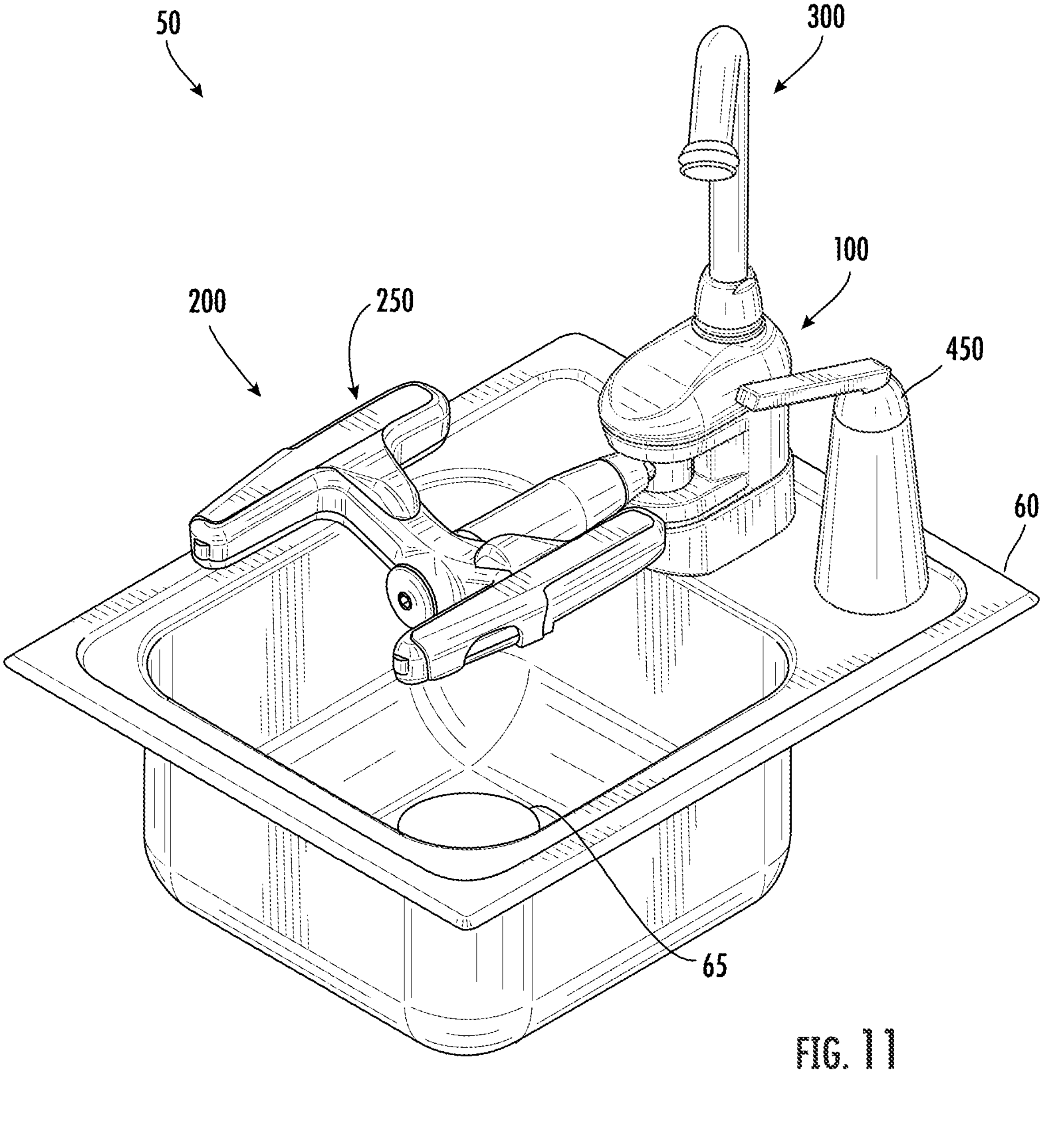
FIG. 11 is a front, right perspective view of a combination emergency wash and faucet system including a eye/face wash, according to an exemplary embodiment.
Figure 12:
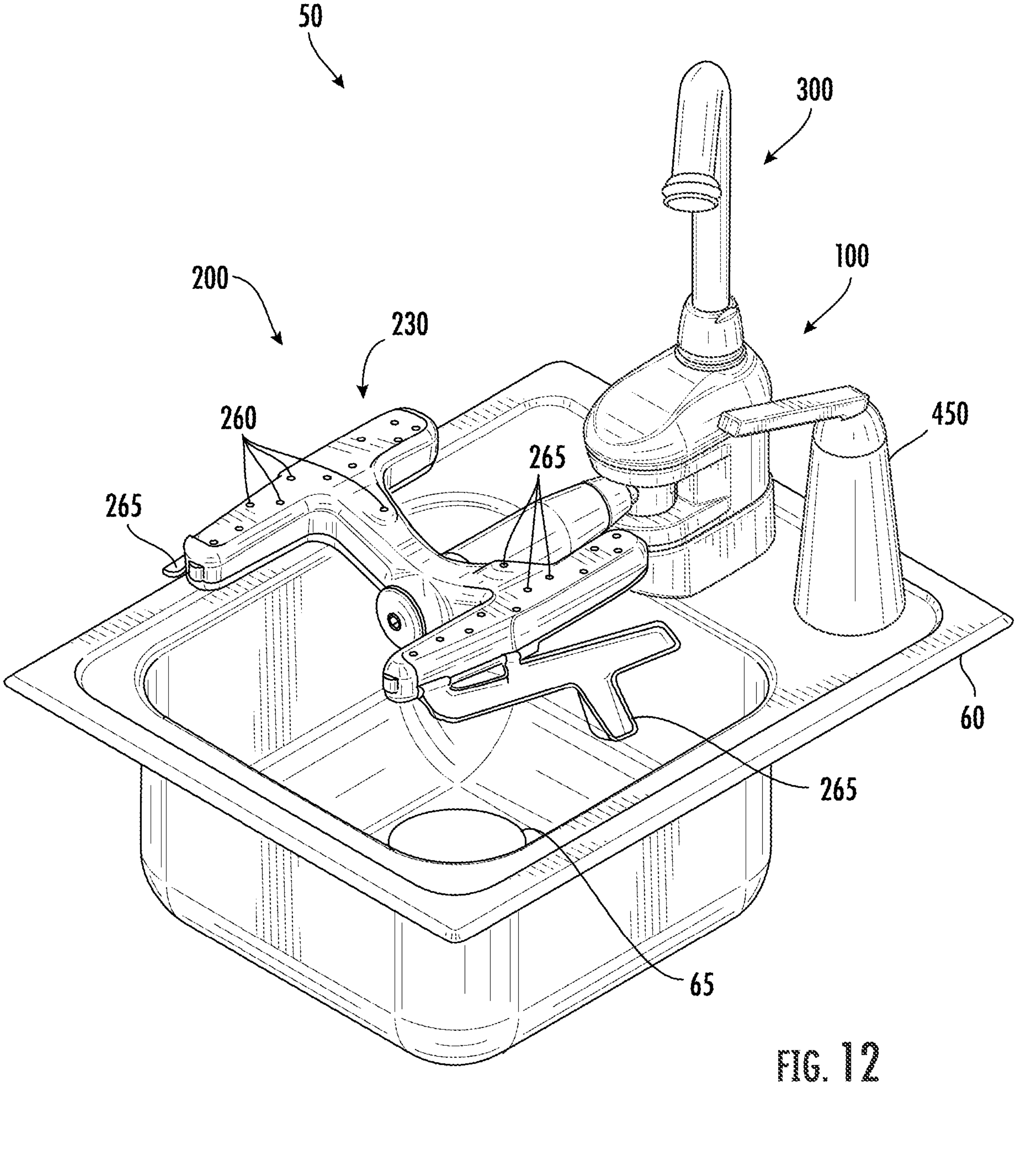
FIG. 12 is a front, right perspective view of the combination emergency wash and faucet system of FIG. 11.

Referring to FIGS. 11 and 12, an alternative embodiment of the fixture 50 is shown. In this embodiment, the eyewash 230 is replaced with an emergency wash unit, shown as facewash 250. The facewash defines a series of outlets or openings, shown as nozzles 260, which are configured to direct fluid towards a person's face. The nozzles 260 may be configured to cover a larger area of the face than the apertures 240 of the eyewash 230. The facewash 250 includes covers 265 that cover the nozzles 260, functioning similarly to the covers 245. Although FIGS. 11 and 12 illustrate the covers 265 as being closed and opened, respectively, with the emergency wash arm 200 in the active position, it should be understood that the covers 265 may normally remain closed unless water flows out of the nozzles 260.

Figure 13:
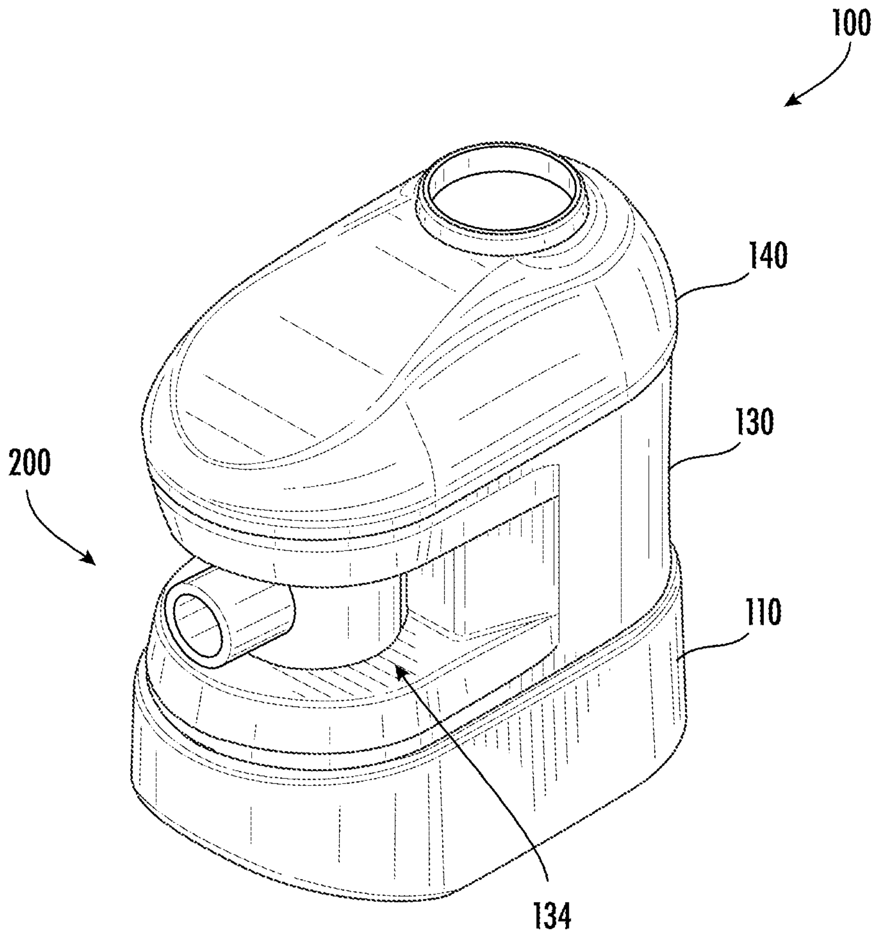
FIG. 13 is a front, right perspective view of a body of the combination emergency wash and faucet system of FIG. 1.
Figure 14:
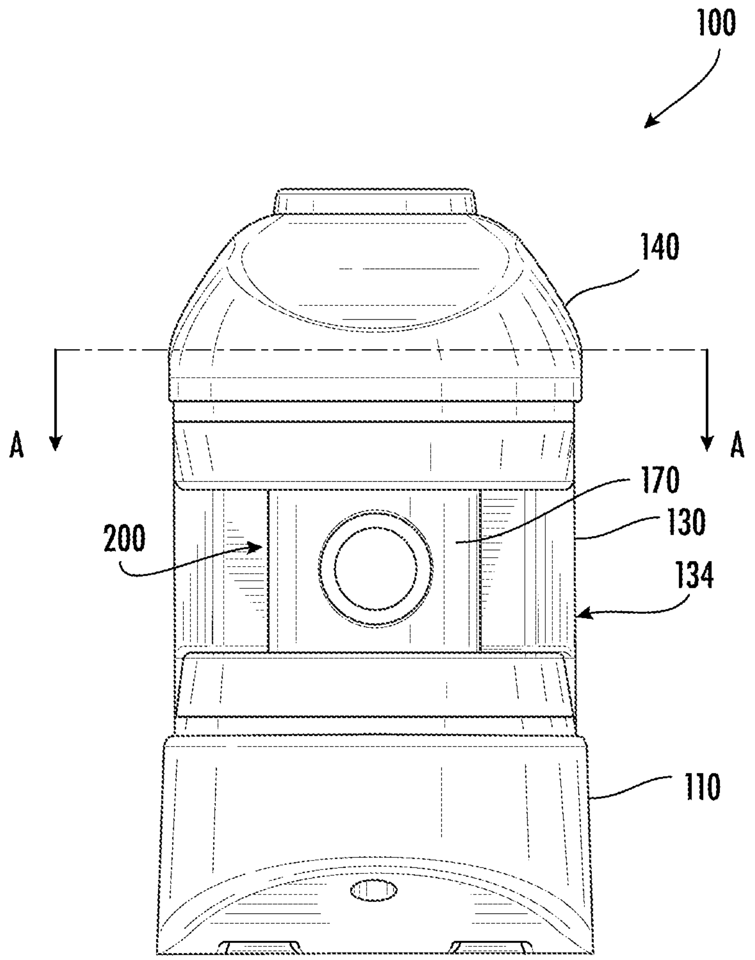
FIG. 14 is a front view of the body of FIG. 13.

Referring now to FIGS. 13 and 14, the base 100 includes: a bottom portion, frame, or body, shown as base frame 110; a middle portion, frame, or body, shown as main housing 130; and a top portion, body, or cover, shown as base cover 140. The base frame 110 is configured to be coupled to the sink 60. The main housing 130 is coupled to a top surface of the base frame 110. The main housing 130 defines an emergency wash arm recess, shown as arm recess 134, that receives an end of the emergency wash arm 200. In some embodiments, the arm recess 134 is shaped to permit at least 180° of rotation of the emergency wash arm 200 without interference with the main housing 130. The base frame 110, the main housing 130, and the base cover 140 are coupled to one another using a series of fasteners, shown in FIGS. 16, 18, and 19 as bolts 118. The base cover 140 is coupled to a top surface of the main housing 130. The base 100 is generally elliptical in shape. In other embodiments, the base 100 may have a different shape.

Figure 15:
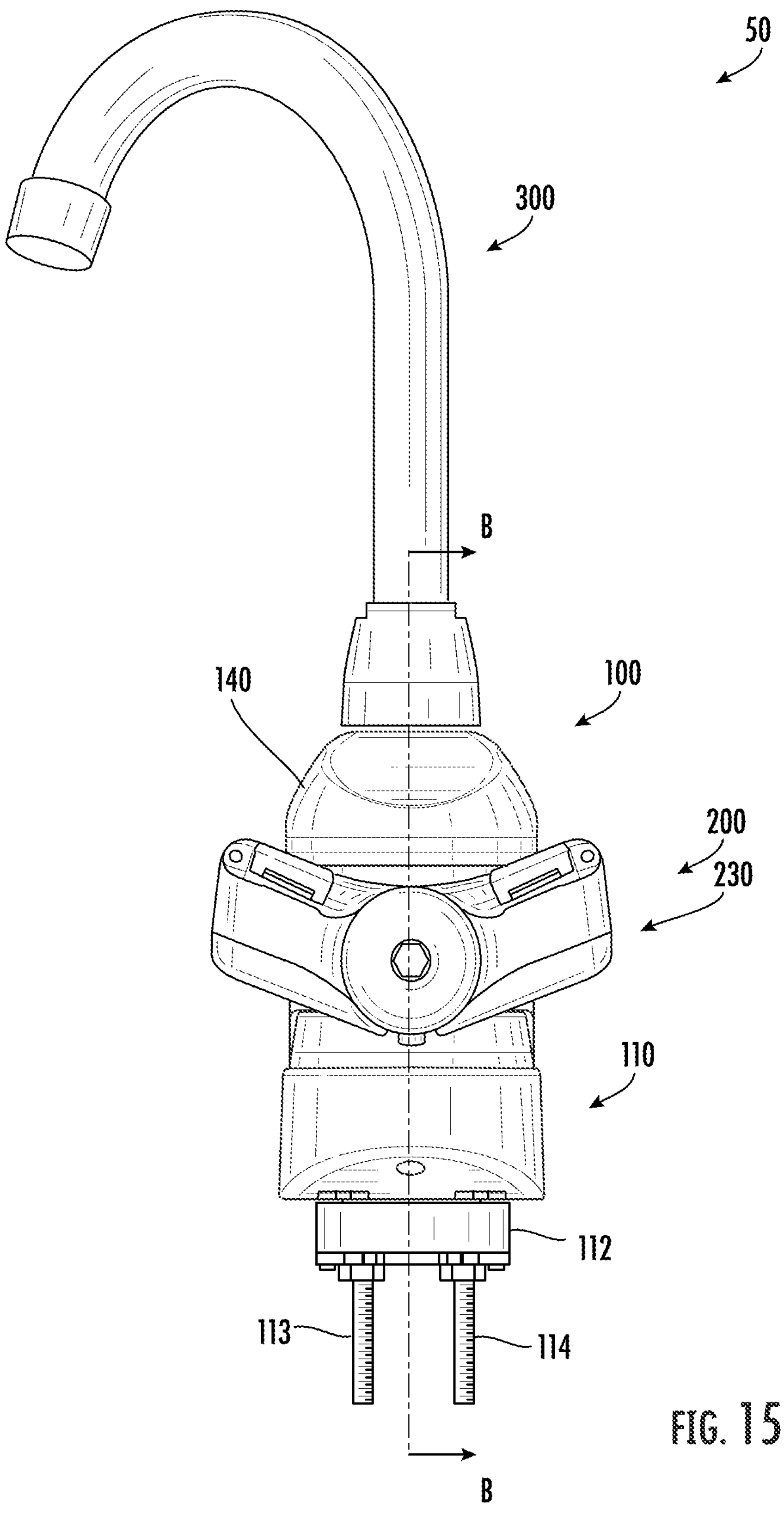
FIG. 15 is a front view of the combination emergency wash and faucet system of FIG. 1.

Referring now to FIG. 15, the base 100 includes a protrusion or collar, shown as neck 112, coupled to and extending below the base frame 110. One or more couplers or fasteners, shown as studs 113, 114, are coupled to and extend below the neck 112. The neck 112 and the studs 113, 114 may cooperate to couple the base 100 to the sink 60 and/or to a countertop supporting the sink 60. By way of example, the neck 112 may extend through an aperture defined by the sink 60, locating the base 100 within a horizontal plane of the countertop. The base frame 110 may be wider than the neck 112 such that the base frame 110 engages a top surface of the sink 60 and/or the countertop. The studs 113, 114 may each engage with one or more fasteners (e.g., nuts, washers, etc.) that extend along a bottom side of the sink 60 and/or the countertop, coupling the base 100 to the sink 60. As shown, the studs 113, 114 are externally threaded, however, the studs 113, 114 may be replaced with any type of fastener (e.g., bolts, rivets, screws, etc.). Alternatively, the base 100 may be coupled to the sink 60 by an adhesive, a snap fit, a quick release, or other type of coupling. In such embodiments, the neck 112 and the base frame 110 may facilitate the coupling (e.g., the exterior of the neck 112 may be threaded to engage with a nut).

Figure 16:
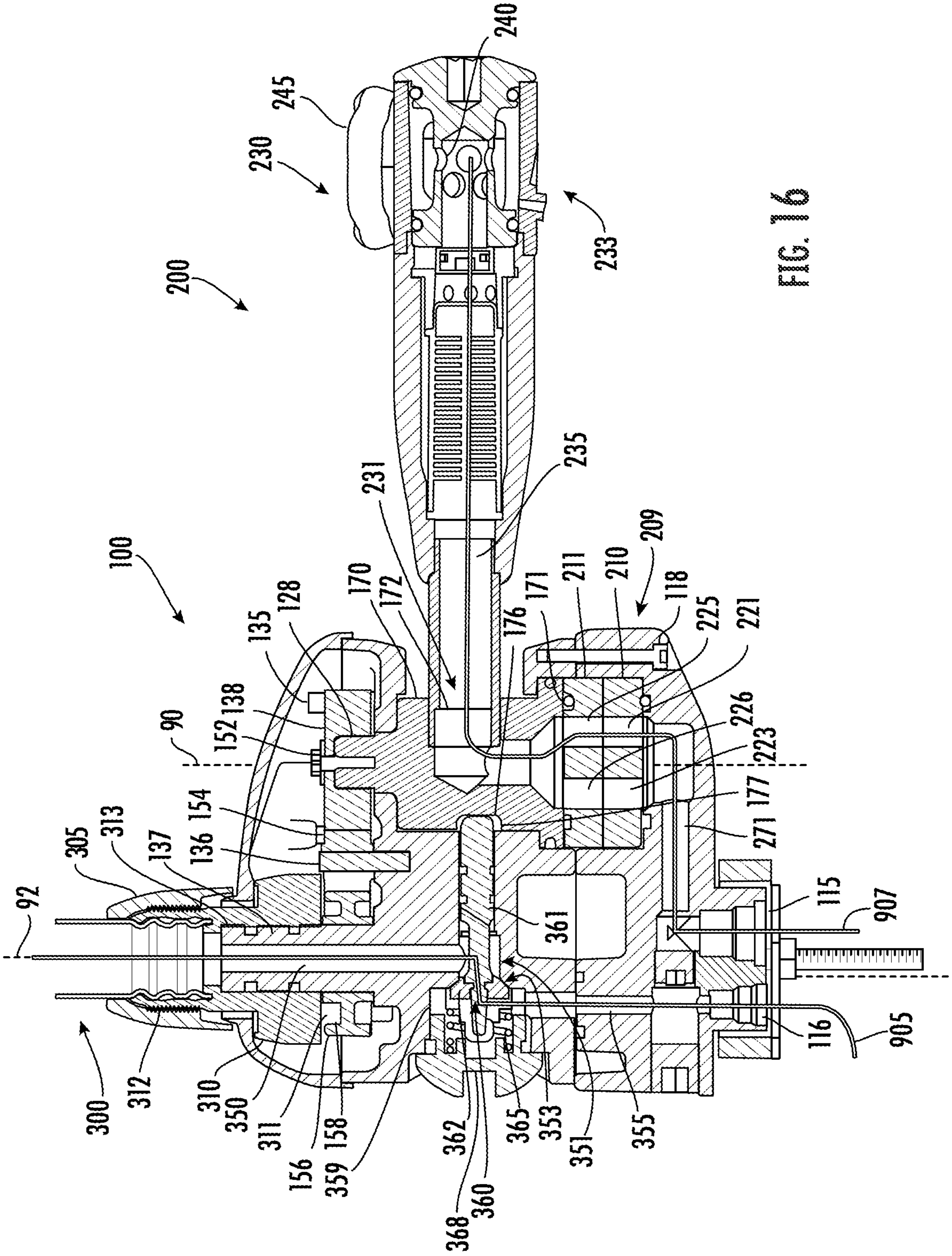
FIG. 16 is a section view of the combination emergency wash and faucet system of FIG. 1 along the line B-B of FIG. 15.
Figure 17:
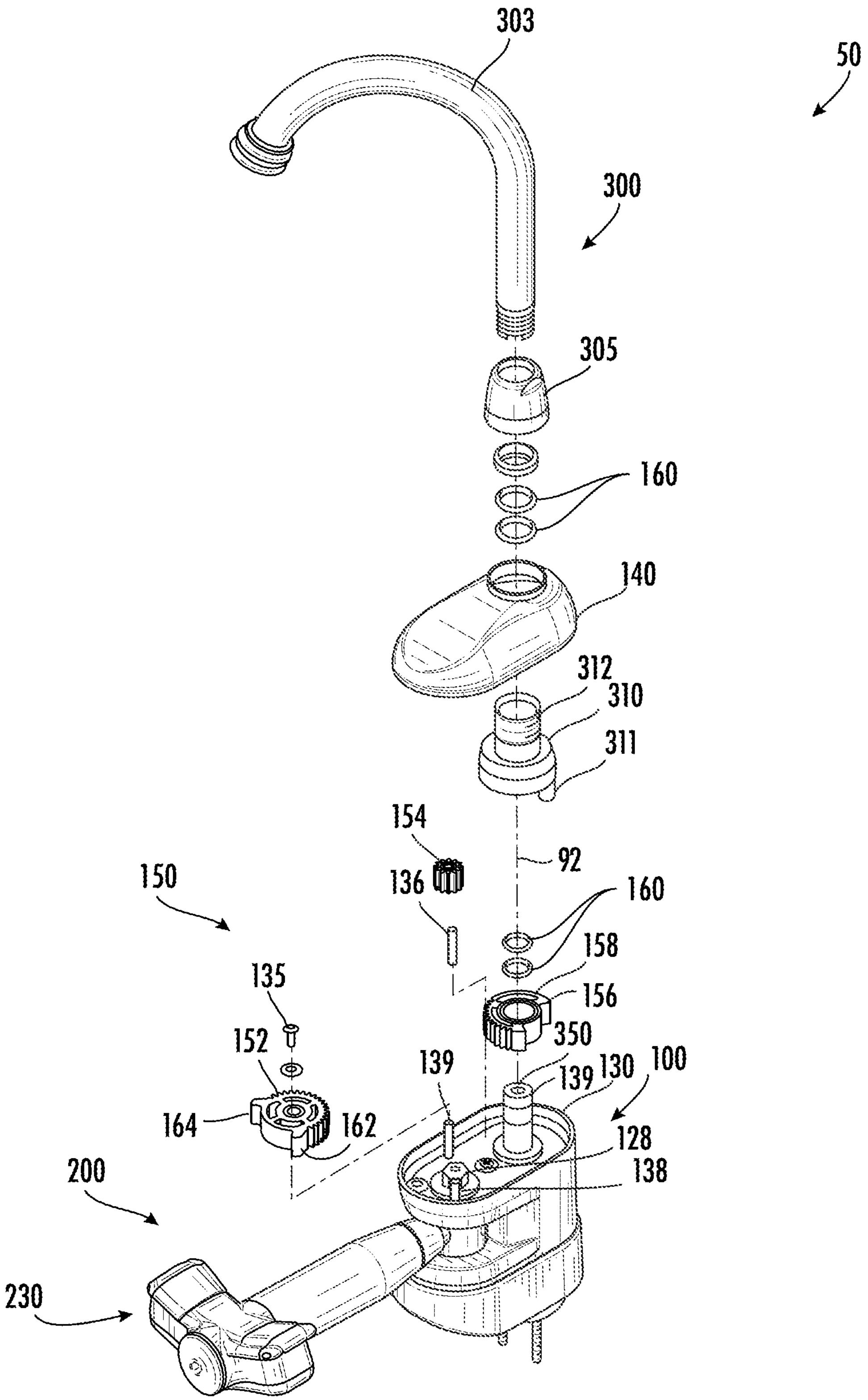
FIGS. 17-19 are various exploded views of the combination emergency wash and faucet system of FIG. 1.
Figure 18:
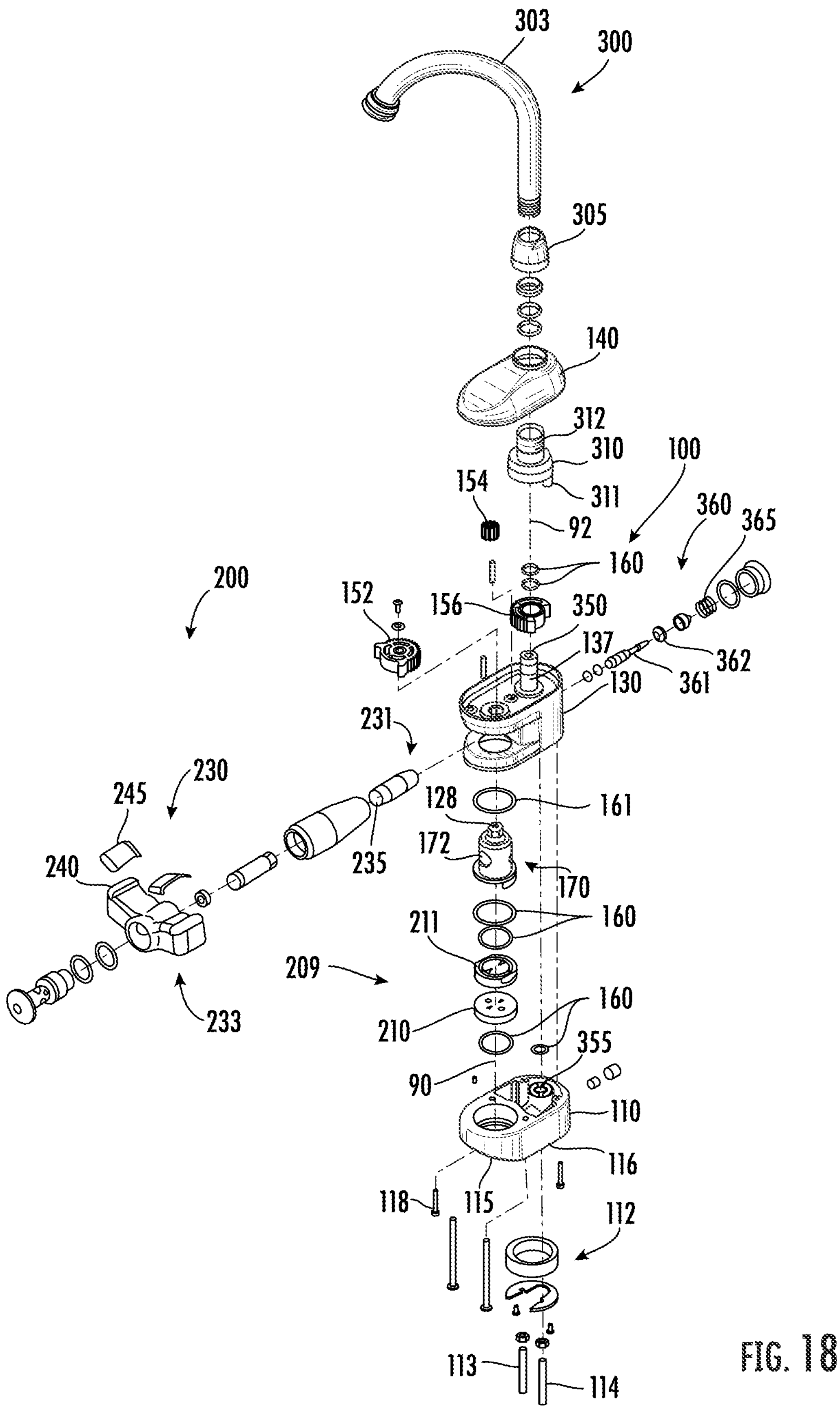

Referring to FIGS. 16-18, the spout assembly 300 includes a tubular member, shown as spout neck 303, coupled to (e.g., crimped together with) a faucet main body, shown as faucet support 310. Although the spout neck 303 is shown having a generally arcuate shape, the spout neck 303 may have any shape (e.g., flat, angled, curved, etc.). Additionally or alternatively, the cross-sectional shape, the length, and the width of the spout neck 303 may vary between different embodiments. A faucet cover 305 is in threaded engagement with a threaded portion 312 of the faucet support 310. The faucet cover 305 and the base cover 140 of the base 100 cover (e.g., visually obscure) the connection between the spout neck 303 and the faucet support 310. The faucet support 310 defines a central passage or aperture, shown as shaft aperture 313. The shaft aperture 313 extends through the center of the faucet support 310 and is fluidly coupled to the spout neck 303. The main housing 130 of the base 100 includes a vertical protrusion, shown as shaft 137, that is received within the shaft aperture 313. The shaft 137 and the shaft aperture 313 are shaped and sized (shown as circular) such that the faucet support 310 pivotally couples the spout assembly 300 to the base 100. A protrusion (e.g., a peg, a flange, etc.), shown as stop protrusion 311, is fixedly coupled to (e.g., formed as a unitary member with) faucet support 310. The stop protrusion 311 extends downward from the main portion of the faucet support 310. The stop protrusion 311 is radially offset from (e.g., not aligned with) the vertical axis 92.

Referring to FIG. 16, the base 100 is configured to selectively fluidly couple a source of tepid water to the emergency wash arm 200 and source of mixed water to the spout assembly 300. The base 100 defines (a) a first fluid path 905 (e.g., a fixture fluid path) between a first aperture, shown as inlet 116, and the spout assembly 300, and (b) a second fluid path 907 (e.g., an emergency wash fluid path) between a second aperture, shown as inlet 115, and the emergency wash arm 200. The inlet 116 is configured to be fluidly coupled to the source of mixed fluid (e.g., the output of the cold water handle 401 and the hot water handle 402). The inlet 115 is configured to be fluidly coupled to the source of tepid water (e.g., an output of a thermostatic mixing valve). The inlet 115 and the inlet 116 are positioned at the bottom of the base 100. This may facilitate connection to the water sources below the sink 60 such that the connection is visually obscured to an observer positioned above the sink 60. As shown in FIGS. 16-19, the fixture 50 includes a series of seals, shown as o-ring seals 160, that seal various fluid connections between components and/or prevent egress of dust.

Referring to FIGS. 16-20, the base frame 110 of the base 100 defines a first aperture or passage, shown as fluid channel 271, which defines a portion of the fluid path 907. The fluid channel 271 fluidly couples the inlet 115 to a valve assembly, shown as disc valve 209. The disc valve 209 selectively fluidly couples the fluid channel 271 to a rotating body or connector, shown as hub 170, based on the position of the emergency wash arm 200. The hub 170 defines an outlet 172 that is fluidly coupled to the emergency wash arm 200. Accordingly, the inlet 115 is selectively fluidly coupled to the emergency wash arm 200 via the fluid path 907, which is defined by the inlet 115, the fluid channel 271, the disc valve 209, and the hub 170.

Referring to FIG. 16, the base frame 110 and the main housing 130 define an aperture or passage, shown as fluid channel 355, which defines a portion of the fluid path 905. The fluid channel 355 fluidly couples the inlet 116 to a valve assembly, shown as spool valve 360. The main housing 130 defines an aperture or passage, shown as fluid channel 350, extending upward from the spool valve 360 to the faucet support 310. The fluid channel 350 is substantially centered within the shaft 137. The spool valve 360 selectively fluidly couples the fluid channel 355 to the fluid channel 350 based on the position of the emergency wash arm 200. Accordingly, the inlet 116 is selectively fluidly coupled to the spout assembly 300 through (i.e., the fluid path 905 is defined by) the inlet 116, the fluid channel 355, the spool valve 360, and the fluid channel 350.

Figure 19:
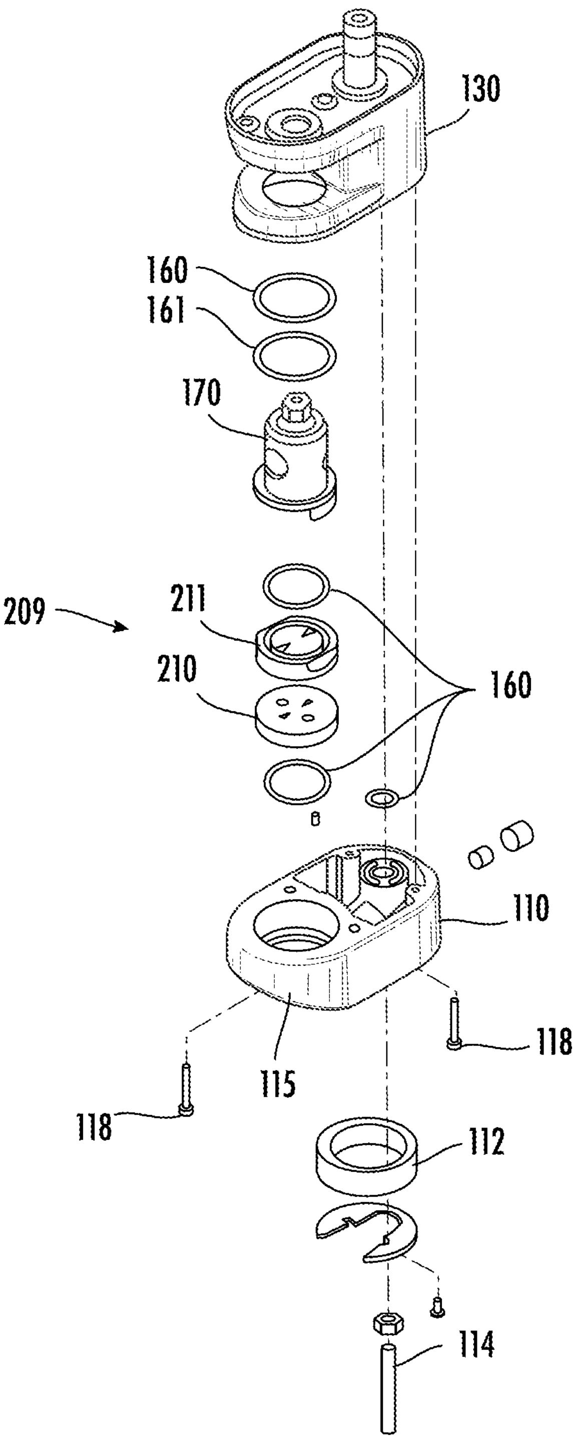
Figure 20:
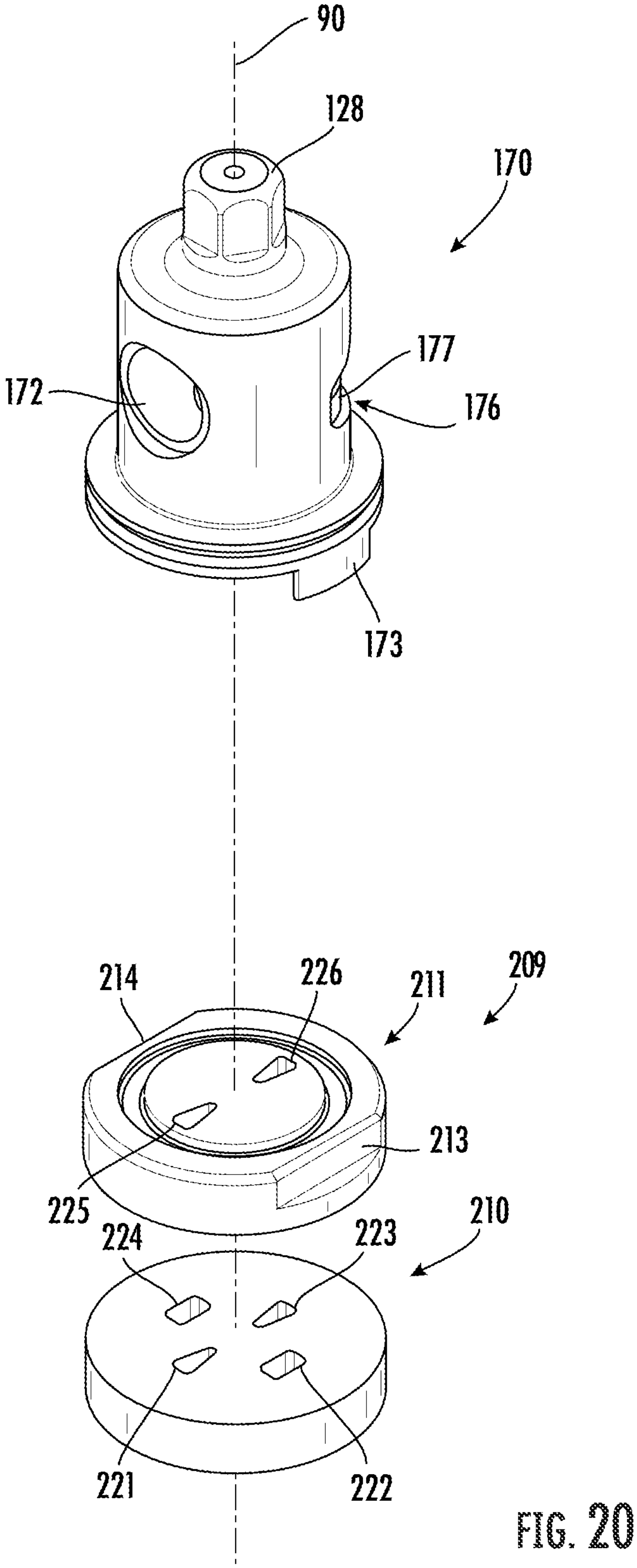
FIG. 20 is an exploded view of a disc valve assembly of the combination emergency wash and faucet system of FIG. 1.

Referring to FIGS. 16, 19, and 20, the disc valve 209 includes a first valve element, shown as bottom disc 210, and a second valve element, shown as top disc 211. The bottom disc 210 and the top disc 211 are substantially cylindrical and approximately the same size. In some embodiments, the bottom disc 210 and the top disc 211 are made from a ceramic material.

The bottom disc 210 is fixedly coupled to the base frame 110 such that the bottom disc 210 is stationary relative to base frame 110. The bottom disc 210 defines two fluid communication apertures, shown as fluid flow apertures 221, 223, which extend through the entire height of the bottom disc 210. The bottom disc 210 further defines a pair of locking apertures 222, 224, which extend at least partway through the height of the bottom disc 210. The fluid flow apertures 221, 223 are each fluidly coupled to the inlet 115 through the fluid channel 271. The locking apertures 222, 224 may receive corresponding protrusions from the base frame 110 to limit (e.g., prevent) rotation of the bottom disc 210 relative to the base frame 110. In other embodiments, the locking apertures 222, 224 are omitted, and the bottom disc 210 is otherwise coupled to the base frame 110 (e.g., using an adhesive)

The top disc 211 is positioned above the bottom disc 210 such that a flat top surface of the bottom disc 210 engages a flat bottom surface of the top disc 211. This creates a seal between the top disc 211 and the bottom disc 210. The base frame 110 contains the top disc 211 and the bottom disc 210 such that both are substantially aligned with (e.g., centered about) the vertical axis 90. The top disc 211 is rotatably coupled to the bottom disc 210 such that the top disc 211 is rotatable relative to the bottom disc 210 about the vertical axis 90. The top disc 211 defines a pair of fluid flow apertures 225, 226 that extend through the entire height of the top disc 211. The fluid flow apertures 225, 226 may have approximately the same size, shape, and spacing as the fluid flow apertures 221, 223. The top disc 211 defines a pair of parallel flat surfaces, shown as flats 213, 214. The flats 213, 214 are positioned on an exterior surface of the top disc 211 and each extend substantially vertically. The flats 213, 214 engage the hub 170, rotationally coupling the emergency wash arm 200 to the top disc 211 such that rotation of the emergency wash arm 200 causes an identical (e.g., in speed, magnitude, and direction) rotation of the top disc 211.

When the emergency wash arm 200 is outside of the active position (e.g., in the stored position, in a position between the active position and the stored position, etc.), the fluid flow apertures 225, 226 are not in alignment with the fluid flow apertures 221, 223. Instead, the fluid flow apertures 225, 226 seal against the flat top surface of the bottom disc 210, preventing fluid from flowing through the disc valve 209. When the eyewash arm 200 is rotated into the active position, the fluid flow apertures 225, 226 are aligned with the fluid flow apertures 221, 223, respectively, thereby fluidly coupling the fluid channel 271 with the hub 170. This permits tepid water to flow through the disc valve 209 and out through the emergency wash arm 200.

The hub 170 is generally cylindrical in shape. In other embodiments, the hub 170 has a different shape and/or size (rectangular, oval, etc.). The hub 170 is received within and pivotally coupled to the main housing 130 of the base 100. Specifically, the hub 170 is centered about the vertical axis 90 and configured to rotate about the vertical axis 90. To facilitate rotation of the hub 170, the fixture 50 includes a friction-reducing member or assembly, shown as bushing 161, that extends between a top surface of the hub 170 and the main housing 130. The bushing 161 is made from a material (e.g., bronze, polymer, etc.) configured to reduce friction between the hub 170 and the main housing 130. In other embodiments, the bushing 161 is replaced with another type of friction-reducing assembly, such as a ball bearing. The hub 170 includes a pair of protrusions, shown as hub flanges 173. The hub flanges 173 extend downward and receive the top disc 211 therebetween. The hub flanges 173 each define a flat surface that engages one of the flats 213, 214 to limit (e.g., prevent) rotation of the top disc 211 relative to the hub 170. Accordingly, the hub flanges 173 rotationally couple the top disc 211 to the hub 170. The hub 170 further includes a protrusion or support, shown as hexagonal stud 128, extending upward from the main portion of the hub 170. The hexagonal stud 128 has a hexagonal cross section and is substantially centered about the vertical axis 90.

The hub 170 defines an aperture, shown as inlet 171, positioned at the bottom of the hub 170, which is fluidly coupled to the outlet 172. The inlet 171 is substantially centered about the vertical axis 90. The inlet 171 is fluidly coupled to the fluid flow apertures 225, 226 of the top disc 211. The outlet 172 receives an end of the connecting pipe 235 of the emergency wash arm 200 and fluidly couples the inlet 171 to the emergency wash arm 200. The emergency wash arm 200 is fixedly coupled to the hub 170.

Figure 21:
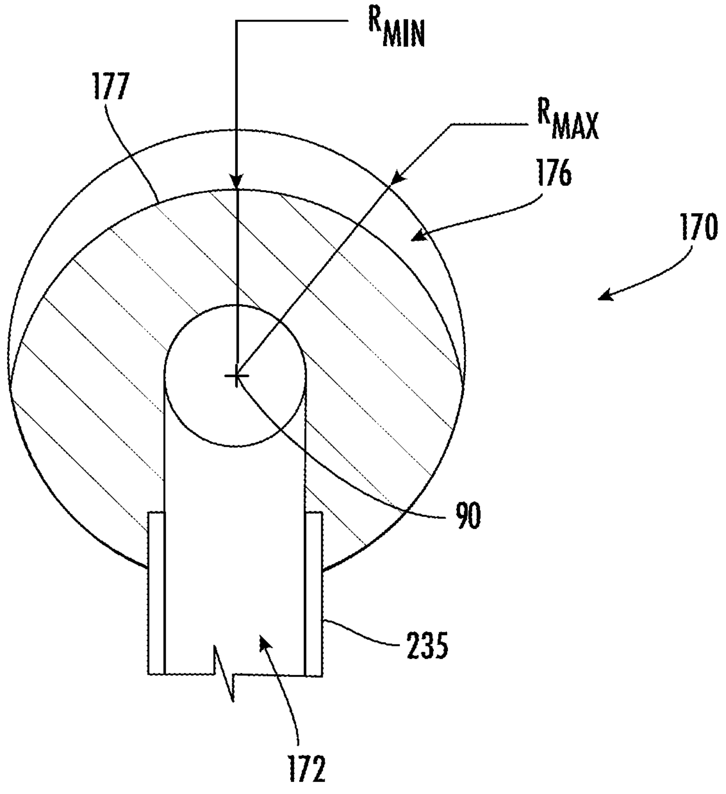
FIG. 21 is a top section view of the disc valve assembly of FIG. 20.

Referring to FIGS. 20 and 21, the hub 170 defines a recess, groove, slot, or notch, shown as hub slot 176, positioned opposite the outlet 172. The hub slot 176 extends along a circumference of the hub 170 and generally extends within a horizontal plane. In some embodiments, a curvature of the hub slot 176 viewed perpendicular to the circumference of the hub 170 is substantially circular (e.g., such that the cross sectional shape of the hub slot 176 is substantially semicircular). An outer portion of the hub slot 176 defines a control surface, shown as cam surface 177. A depth of the hub slot 176 extends between an outer surface of the hub 170 adjacent the hub slot 176 and the cam surface 177. Specifically, a distance between the outer surface of the hub 170 and the vertical axis 90 (i.e., a radius of the outer surface) is a radius $R_{MAX}$. The radius of the cam surface 177 gradually decreases from the radius $R_{MAX}$ to a radius $R_{MIN}$. The radius $R_{MIN}$ is located at the center of the hub slot 176, directly opposite the outlet 172.

Referring to FIG. 16, the spool valve 360 is received within an aperture or passage, shown as spool passage 351, and a recess, shown as spool cavity 359, both of which are defined by the main housing 130. The spool cavity 359 is positioned near the back of the main housing 130, opposite the hub 170. The spool cavity 359 is intersected by the fluid channel 355, and the spool passage 366 is intersected by the fluid channel 350. The spool passage 351 extends horizontally between the hub 170 and the spool cavity 359.

Figure 22:
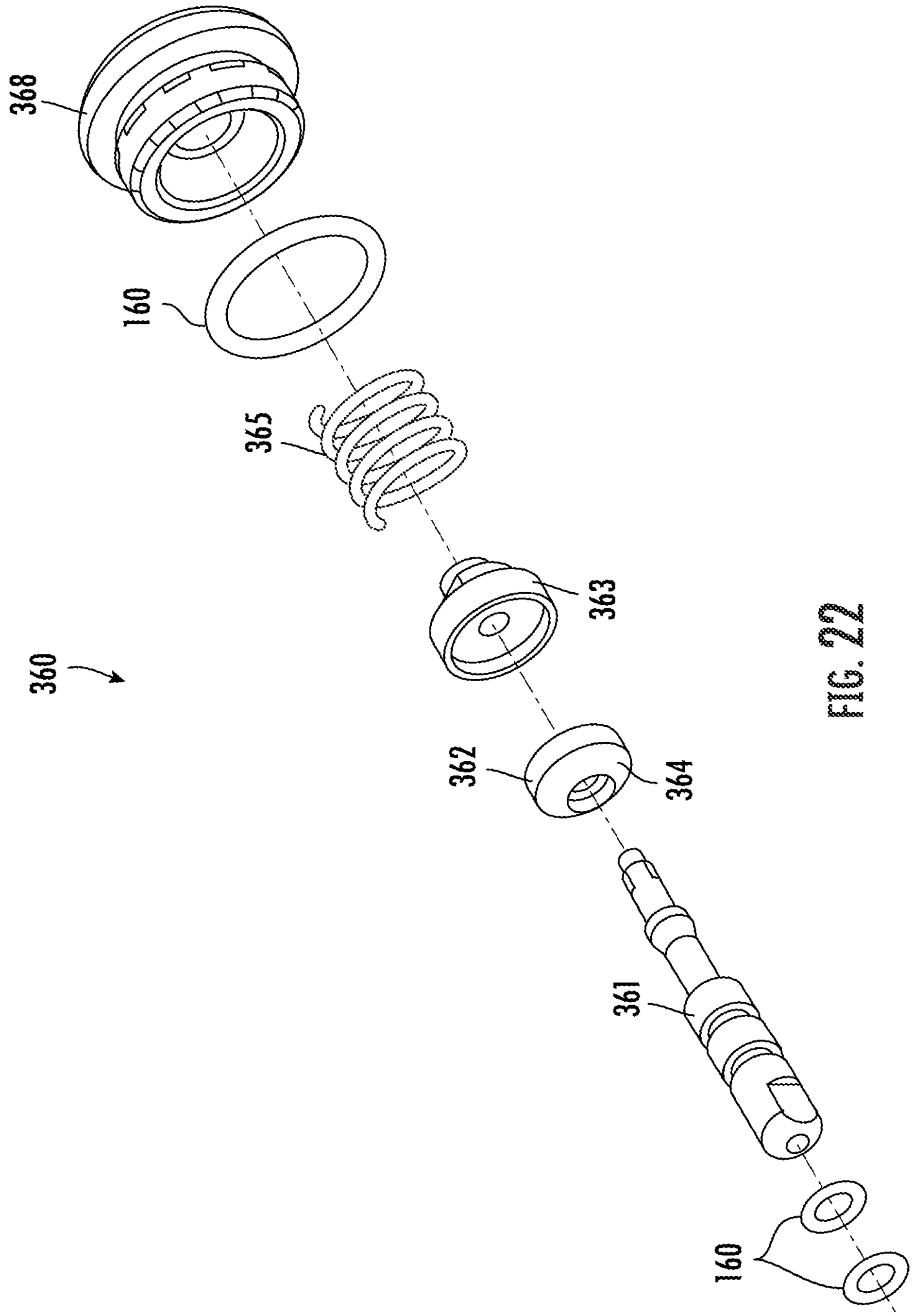
FIG. 22 is an exploded view of a spool valve assembly of the combination emergency wash and faucet system of FIG. 1.

Referring to FIGS. 16 and 22, the spool valve 360 includes a valve element (rod, shaft, etc.), shown as spool 361, an annular collar, flange or valve element, shown as sealing collar 362, a collar, shown as cap 363, a biasing element or biasing member, shown as spring 365, and a fitting or cap 368 configured to retain the spool valve 360 within the base 100. The spool 361 is generally cylindrical in shape. In some embodiments, an end of the spool 361 closest to the hub 170 has a slight taper (e.g., to match or substantially match the curvature of the cam surface 177). In the spool valve 360 is generally aligned with a horizontal plane. In some embodiments, the spool valve 360 is generally aligned with a horizontal plane through which the emergency wash arm 200 travels. The spool 361 extends horizontally within the spool passage 351, and an end of the spool 361 engages the cam surface 177 of the hub 170. The spool 361 is coupled, particularly slidably, to the main housing 130 and configured to translate horizontally along the spool passage 351. The spool 361 sealingly engages the wall of the spool passage 351, preventing fluid from the spool passage 351 from reaching the hub 170 (i.e., fluidly decoupling the first fluid path 905 from the second fluid path 907). The sealing collar 362 is coupled to an end of the spool 361 opposite the hub 170. By way of example, the end of the spool 361 may be received in a bore of the sealing collar 362. The cap 363 receives the sealing collar 362. The cap 368 is fixedly coupled to the main housing 130, sealing the spool cavity 359 from the surroundings. The spring 365 extends between and engages the cap 363 and the cap 368, applying a biasing force that biases the cap 363, the sealing collar 362, and the spool 361 toward the hub 170. In other embodiments, one or more of the spool 361, the sealing collar 362, and the cap 363 are formed as a single, continuous piece. In other embodiments, the first fluid path 905 is otherwise fluidly decoupled from the second fluid path 907 based on the position of the emergency wash arm 200. By way of example, the spool valve 360 may be replaced with a different type of valve that is operatively coupled to the emergency wash arm, such as a disc valve, a ball valve, or a butterfly valve.

A wall of the spool cavity 359 surrounding the spool passage 351 defines a sealing surface, shown as annular surface 353. The annular surface 353 is frustoconical and decreases in diameter as it extends toward the hub 170. The sealing collar 362 defines a sealing surface, shown as annular surface 364. The annular surface 364 and the annular surface 353 are correspondingly shaped such that the sealing collar 362 seals the spool passage 351 from the spool cavity 359 when the annular surface 364 engages the annular surface 353. Accordingly, the biasing force of the spring 365 biases the sealing collar 362 into engagement with the annular surface 353.

Referring to FIGS. 16 and 21, engagement between the end of the spool 361 and the cam surface 177 controls operation of the spool valve 360. Because of the biasing force of the spring 365, the spool 361 is in constant contact with the cam surface 177, at least until the spool valve 360 is sealed. Accordingly, the position of the spool 361 along the length of the spool passage 351 correlates to the radius of the cam surface 177 at the point of engagement with the spool 361. When the radius of the cam surface 177 is larger, the spool 361 is forced away from the vertical axis 90. The radius of the cam surface 177 changes along the length of the cam surface 177. Accordingly, the position of the spool 361 changes as the emergency wash arm 200 is rotated. In some embodiments, the end or tip of the spool 361 that engages the cam surface 177 may be configured to reduce friction between the spool 361 and the cam surface 177, thereby facilitating movement of the spool 361 along the cam surface 177 during operation. By way of example, one or both of the tip of the spool 361 and the cam surface 177 may include a low-friction material (e.g., bronze, nylon, Teflon, etc.) or a friction reducing member (e.g., a ball bearing, etc.) that reduces friction between the spool 361 and the cam surface 177.

When the emergency wash arm 200 is in the stored position, the spool 361 is in contact with the largest part of the cam surface 177 (e.g., having a radius of $R_{MAX}$). The cam surface 177 forces the spool 361 away from the vertical axis 90 thereby forcing the sealing collar 362 out of engagement with the annular surface 353. The spool valve 360 is thus in an open or unsealed configuration (i.e., the spool 361 and the sealing collar 362 are in an unsealed or open position) where the spool valve 360 permits fluid to flow freely along the first fluid path 905. As the emergency wash arm 200 rotates toward the active position, the radius of the cam surface 177 at the point of engagement with the spool 361 gradually decreases, permitting the spring 365 to move the spool 361 toward the vertical axis 90. As the emergency wash arm 200 approaches the active position, the radius of the cam surface 177 decreases to where the sealing collar 362 is permitted to engage the annular surface 353. The spool valve 360 is thus in a sealed or closed configuration (i.e., the spool 361 and the sealing collar 362 are in a closed or sealed position) where the spool valve 360 limits (e.g., completely prevents) fluid to flow from the spool cavity 359 to the spool passage 351 or the fluid channel 350.

Accordingly, when the emergency wash arm 200 is in the stored position, the spool valve 360 permits fluid to flow out of the spout assembly 300 (e.g., as controlled by the handles 401, 402), and the disc valve 208 limits (e.g., completely prevents) fluid flow out of the emergency wash arm 200. In response to the emergency wash arm 200 moving to the active position, the spool valve 360 limits (e.g., completely prevents) fluid flow out of the spout assembly 300 and permits fluid flow out of the emergency wash arm 200. In some embodiments, the cam surface 177 is symmetrical about a plane extending along the vertical axis 90 and along the center of the emergency wash arm 200 such that the spool valve 360 exhibits similar or identical flow control characteristics when the fixture 50 is in a right-handed configuration and when the fixture 50 is in a left-handed configuration.

Figure 23:
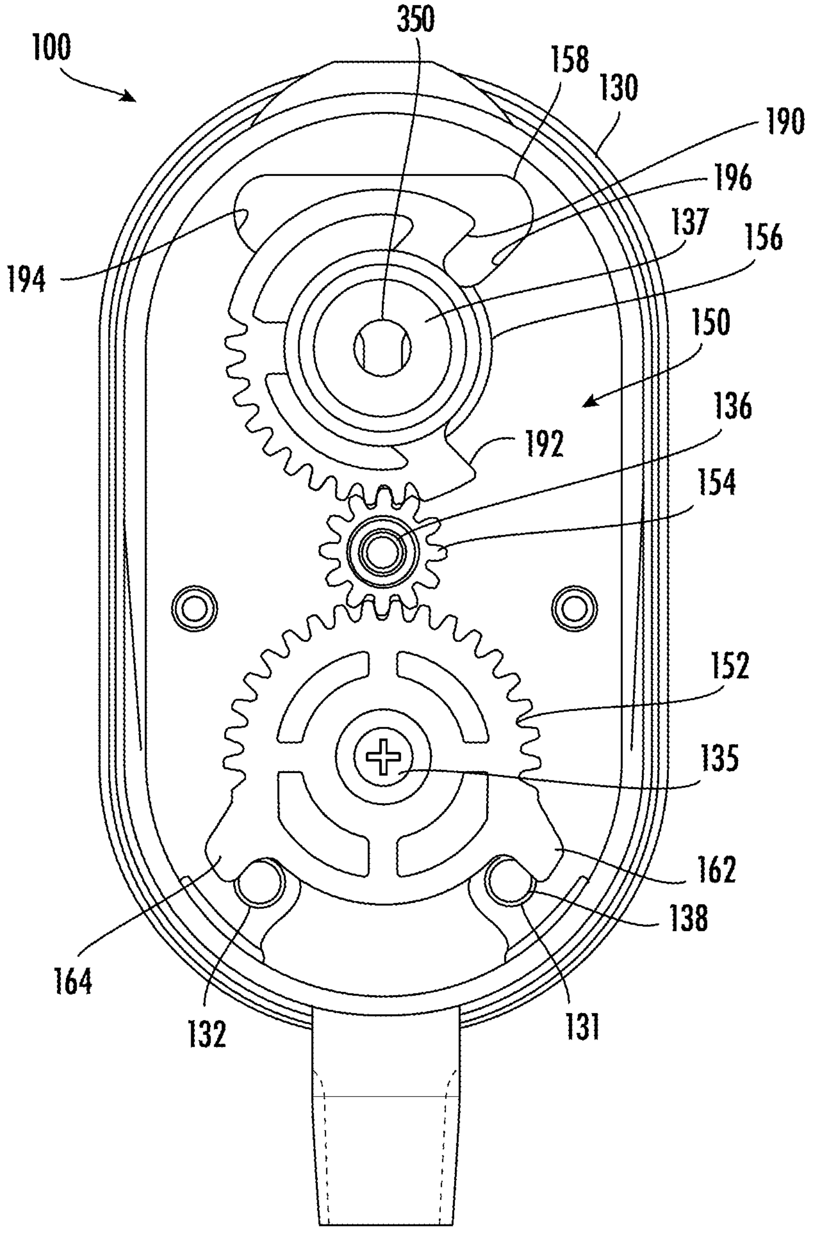
FIG. 23 is a section view of the combination emergency wash and faucet system of FIG. 1 along the line A-A of FIG. 14.

Referring to FIGS. 17 and 23, the fixture 50 includes a coupling mechanism (e.g., power transmission, rotation control assembly, etc.) that is shown as a gear train 150. The gear train 150 is configured to control rotation of the spout assembly 300 and the emergency wash arm 200. Specifically, the gear train 150 is configured to limit rotation of the emergency wash arm 200 to a first rotational range having a constant width, and the gear train 150 is configured to limit rotation of the emergency wash arm 200 to a second rotational range having a width that varies based on a rotational position of the emergency wash arm 200. By way of example, the width of the first rotational range may be approximately 90°. By way of example, the width of the second rotational range may range from approximately 90° when the emergency wash arm 200 is in the stored position to approximately 0° when the emergency wash arm 200 is in the active position.

The gear train 150 includes rotators, transmission members, or rotation control members, shown as wash gear 152 (e.g., driver, master member), idler gear 154 (e.g., intermediate member), and spout gear 156 (e.g., driven member, slave member). The wash gear 152 is coupled to the hub 170. Specifically, the wash gear 152 defines an aperture that receives the hexagonal stud 128, and is held in place by a fastener 135 that is threaded into the hexagonal stud 128. The wash gear 152 is centered about and rotates about the vertical axis 90. The aperture of the wash gear 152 has a shape that corresponds to the shape of the hexagonal stud 128, limiting (e.g., preventing) rotation of the wash gear 152 relative to the hub 170. The idler gear 154 defines an aperture that receives a support, shown as pin 139, which is coupled to the main housing 130. The idler gear 154 rotates freely on the pin 139, such that the idler gear 154 is rotatably coupled to the main housing 130. The spout gear 156 defines an aperture that receives the shaft 137 of the base 100, rotatably coupling the spout gear 156 to the main housing 130. The spout gear 156 is centered about and rotates about the vertical axis 92.

The wash gear 152 has gear teeth along a portion of its circumference. The idler gear 154 has gear teeth around its entire circumference. The spout gear 156 has gear teeth along a portion of its circumference. The gear teeth of the idler gear 154 mesh with the gear teeth of both the wash gear 152 and the spout gear 156. Accordingly, the idler gear 154 rotationally couples the wash gear 152 with the spout gear 156 such that a rotation of the wash gear 152 produces a corresponding rotation of the spout gear 156 in the same rotational direction and vice versa. In other embodiments, the gear train 150 includes more or fewer idler gears 154. In yet other embodiments, the wash gear 152 and the spout gear 156 are otherwise rotationally coupled. By way of example, the wash gear 152 and the spout gear 156 may each engage a belt (e.g., a V belt, a timing belt, etc.) or a roller chain to be rotationally coupled to one another.

The base 100 includes a protrusion or stop, shown as stop pin 138. The stop pin 138 is selectively repositionable between a first aperture, shown as right-hand pin hole 131, at a first pin location or first pin position and a second aperture, shown as left-hand pin hole 132, at a second pin location or second pin position. The right-hand pin hole 131 and the left-hand pin hole 132 are defined by the main housing 130. Accordingly, the stop pin 138 is selectively coupled to the main housing 130.

The wash gear 152 includes a pair of radial protrusions, shown as stops 162, 164, that extend radially outward from the circumference of the wash gear 152. Each stop 162, 164 defines a stop surface facing the other stop surface. The stops 162, 164 are positioned such that the stop pin 138 contacts or engages with (a) the stop surface of the stop 164 to limit rotation of the wash gear 152 (e.g., and thus the emergency wash arm 200) in a first direction (i.e., counter clockwise as shown in FIG. 23) and (b) the stop surface of the stop 162 to limit rotation of the wash gear 152 in a second direction opposite the first direction (i.e., clockwise as shown in FIG. 23). Accordingly, the wash gear 152 has a first rotation range associated with the first pin location and a second rotation range associated with the second pin location. In some embodiments, the widths of the first and second rotation ranges are between 30° and 180°. In some such embodiments (and as shown), the widths of the first and second rotation ranges are approximately 90°. In other embodiments, the widths of the first and second rotation ranges are greater than 180° (e.g., 200°). In some embodiments, the first and second rotation ranges are symmetrical about a central plane of the faucet 50.

Figure 24:
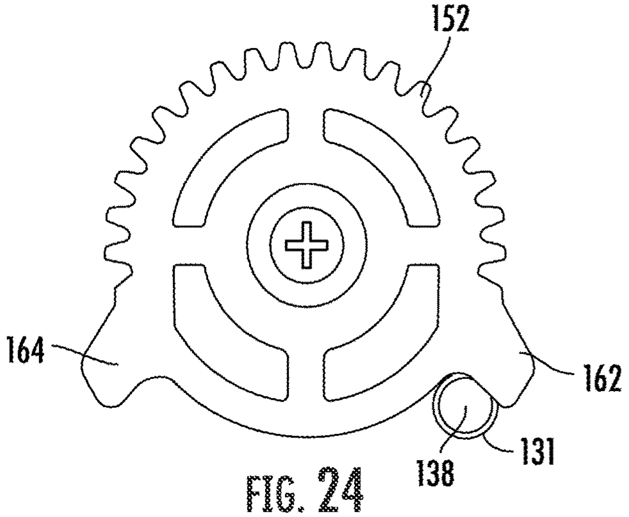
FIG. 24 is a top view of a wash gear of the combination emergency wash and faucet system of FIG. 1 in an active position of a right-handed configuration.
Figure 25:
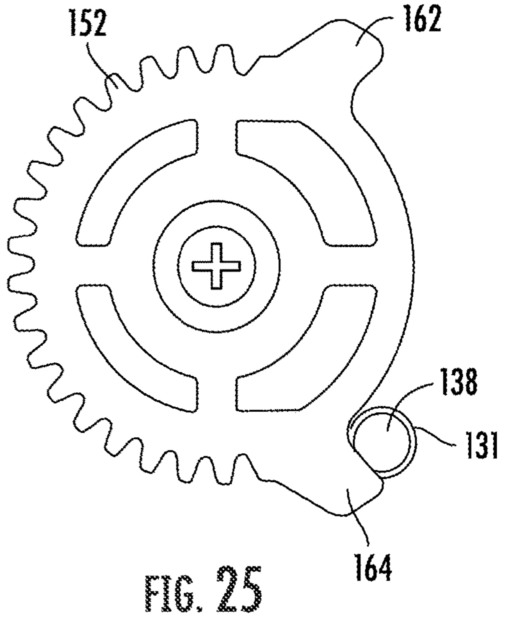
FIG. 25 is a top view of the wash gear of FIG. 24 in a stored position of the right-handed configuration.

FIGS. 24 and 25 illustrate the rotation range of the wash gear 152 with the stop pin 138 in the right-hand pin hole 131 (i.e., in a right-handed configuration of the fixture 50). In FIG. 24, the emergency wash arm 200 is in the active position. The stop pin 138 engages the stop 162, preventing further rotation of the wash gear 152 and the emergency wash arm 200 in the clockwise direction. In FIG. 25, the emergency wash arm 200 is in the stored position. The stop pin 138 engages the stop 164, preventing further rotation of the wash gear 152 and the emergency wash arm 200 in the counter-clockwise direction. Accordingly, the stop pin 138 and the wash gear 152 limit rotation of the emergency wash arm 200 to a desired range. This facilitates a user pushing or pulling the emergency wash arm 200 to a desired position without overshooting. This may be especially useful when the emergency wash arm 200 is in an emergency situation and is visually and/or mentally impaired. Without this stopping action, the user may overshoot to a position where the emergency wash arm 200 is not fully activated, hindering proper operation of the eyewash 230.

Figure 26:
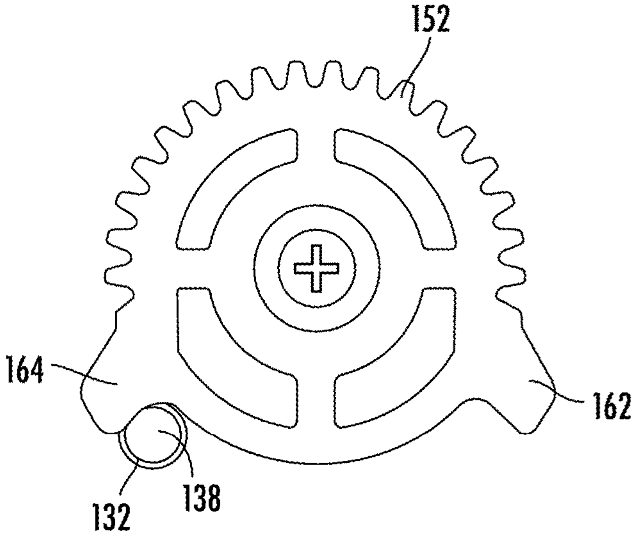
FIG. 26 is a top view of the wash gear of FIG. 24 in an active position of a left-handed configuration.
Figure 27:
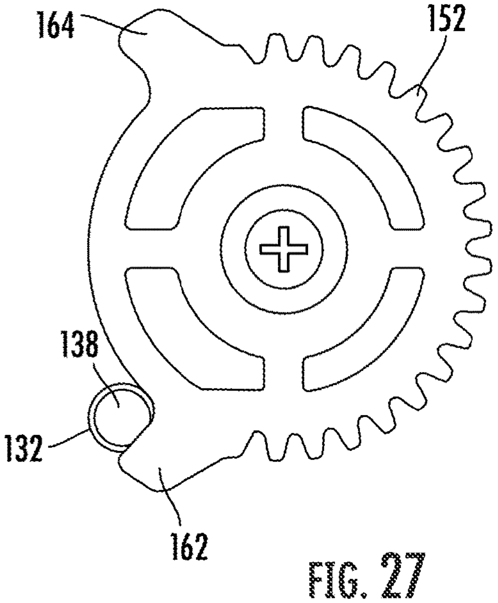
FIG. 27 is a top view of the wash gear of FIG. 24 in a stored position of the left-handed configuration.

FIGS. 26 and 27 illustrate the rotation range of the wash gear 152 with the stop pin 138 in the left-hand pin hole 132

(i.e., in a left-handed configuration of the fixture 50). In FIG. 26, the emergency wash arm 200 is in the active position. The stop pin 138 engages the stop 164, preventing further rotation of the wash gear 152 and the emergency wash arm 200 in the counter-clockwise direction. In FIG. 27, the emergency wash arm 200 is in the stored position. The stop pin 138 engages the stop 162, preventing further rotation of the wash gear 152 and the emergency wash arm 200 in the clockwise direction. Accordingly, the fixture 50 can be reconfigured between a right-handed configuration and a left-handed configuration by moving the stop pin 138 between the right-hand pin hole 131 and the left-hand pin hole 132. This requires no additional parts and minimal technical expertise.

Figure 28:
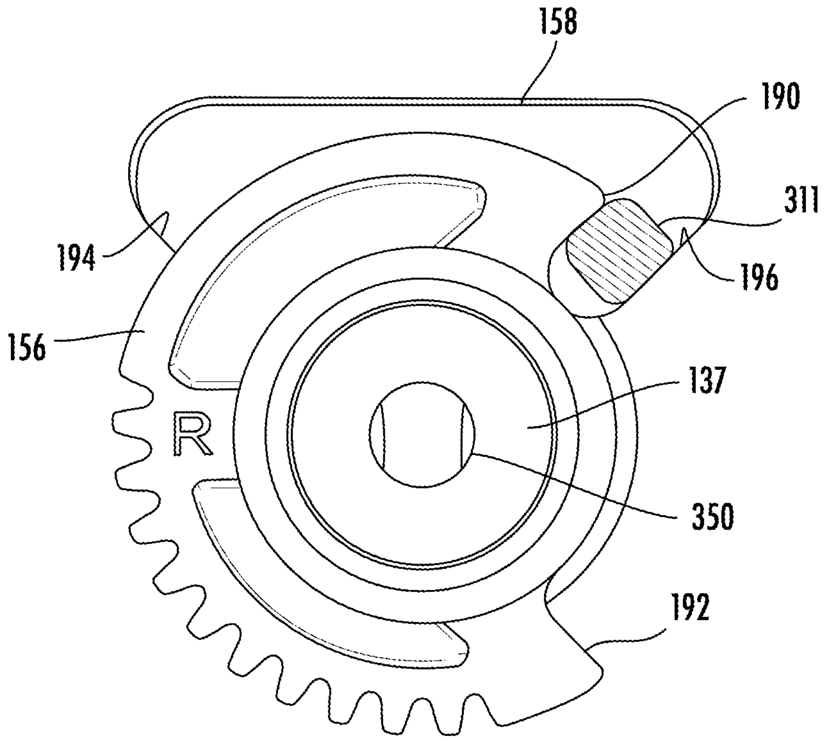
FIG. 28 is a top view of a spout gear of the combination emergency wash and faucet system of FIG. 1 in a first position and in a right-handed configuration.
Figure 29:
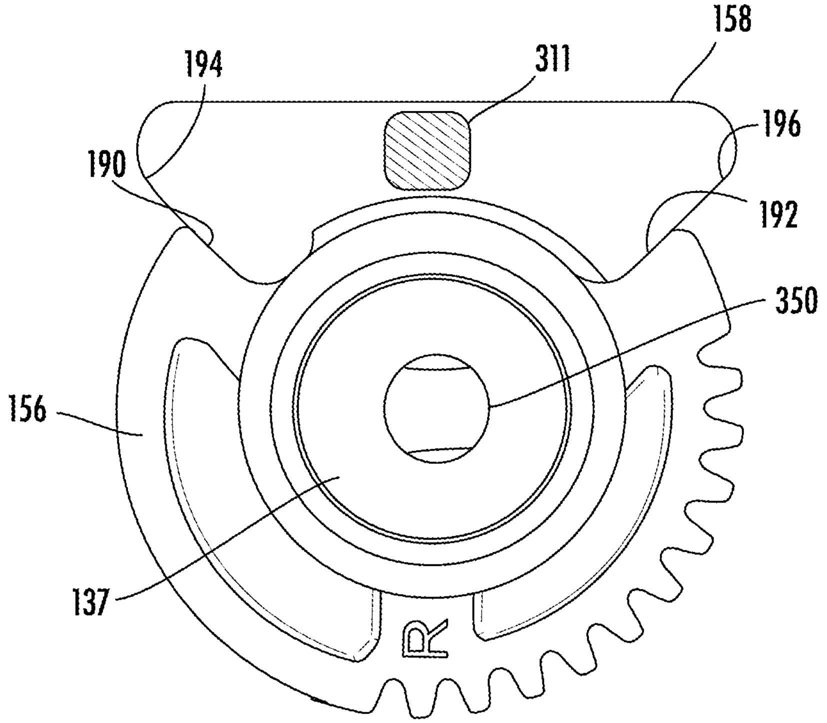
FIG. 29 is a top view of the spout gear of FIG. 28 in a second position and in the right-handed configuration.

Referring to FIGS. 23, 28, and 29, the spout gear 156 defines a pair of radially-extending surfaces, shown as stop surface 190 and stop surface 192, with a recess extending therebetween. The stop surface 190 and the stop surface 192 face one another. The main housing 130 defines a groove, recess, or aperture, shown as angled slot 158, beneath the spout gear 156. One end of the angled slot 158 defines a radially-extending surface, shown as stop surface 194, and the opposite end of the angled slot 158 defines another radially-extending surface, shown as stop surface 196. The stop surface 194 and the stop surface 196 face one another. In some embodiments, an angle between the stop surface 190 and the stop surface 192 is approximately equal to an angle between the stop surface 194 and the stop surface 196.

The stop protrusion 311 of the faucet support 310 extends downward (a) between the stop surface 190 and the stop surface 192 and (b) between the stop surface 194 and the stop surface 196. The stop protrusion 311 rotates with the spout assembly 300. Accordingly, when movement of the stop protrusion 311 is limited, rotation of the spout assembly 300 is correspondingly limited. In FIG. 28, the spout gear 156 is in a position corresponding to the active position of the emergency wash arm 200. In FIG. 29, the spout gear 156 is in a position corresponding to the stored position of the emergency wash arm 200. The stop surface 190 and the stop surface 194 engage the stop protrusion 311 to limit rotation of the spout assembly 300 in a counter-clockwise direction. The stop surface 196 engages the stop protrusion 311 to limit rotation of the spout assembly 300 in a clockwise direction.

When the spout gear 156 is in the position corresponding to the stored position of the emergency wash arm 200, the stop protrusion 311 is free to rotate through a first predefined range until contacting the stop surface 194 or the stop surface 196. In some embodiments, the first range is greater than 180°. In some embodiments, the first range is between approximately 30° and 180 degrees. In some such embodiments, the first range is between approximately 60° and 120°. In particular and in some such embodiments (and as shown), the first range is approximately 90°. The stop surface 190 may not limit rotation of the spout assembly 300 in this configuration. Accordingly, the spout assembly 300 is free to rotate however the user chooses while the emergency wash arm 200 is in the stored position. In other embodiments, the spout assembly 300 may not be free to rotate relative to the emergency wash arm 20 when the emergency wash arm 200 is in the stored position. By way of example, the spout assembly 300 may be fixedly coupled to the emergency wash arm 200 such that the spout assembly 300 and the emergency wash arm 300 rotate in unison.

When the spout gear 156 is in the position corresponding to the active position of the emergency wash arm 200, the stop surface 192 moves toward the stop surface 196, limiting the rotation of the spout assembly 300. In some embodiments, both the stop surface 190 and the stop surface 196 engage the stop protrusion 311, holding the spout assembly 300 in the stored position and preventing further rotation of the spout assembly 300. If the spout assembly 300 is not already in the stored position, the stop surface 190 engages the stop protrusion 311, moving the spout assembly 300 toward the stored position. Accordingly, when the emergency wash arm 200 is moved to the active position, the spout assembly 300 is automatically moved toward the stored position, preventing the spout assembly 300 from interfering with a user's use of the eyewash 230. This is especially useful in emergency situations, where the user may be visually and/or mentally impaired and not able to easily move the spout assembly 300 out of the way manually.

Figure 30:
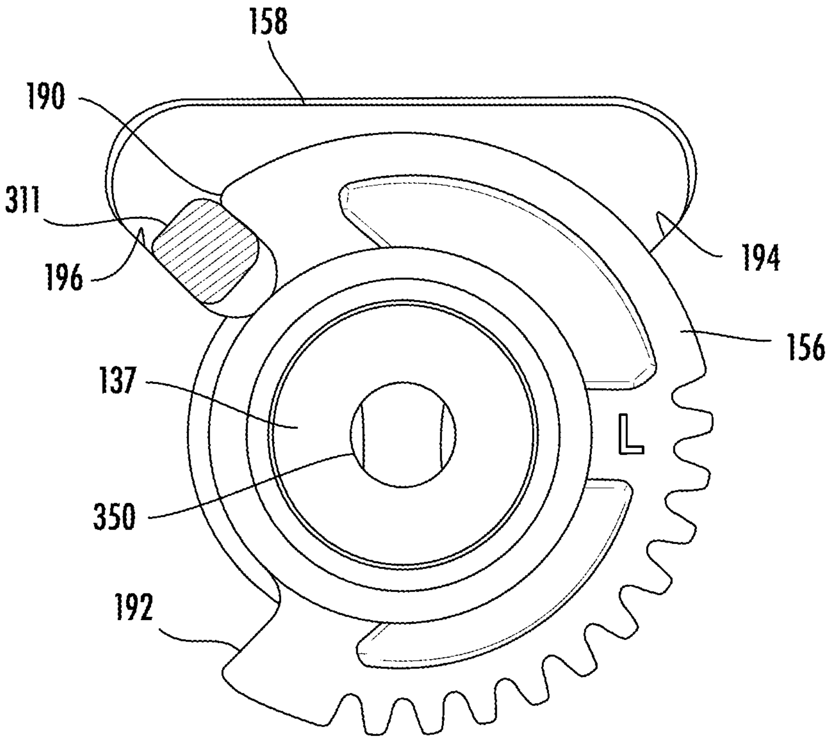
FIG. 30 is a top view of a spout gear of the combination emergency wash and faucet system of FIG. 1 in a first position and in a left-handed configuration.
Figure 31:
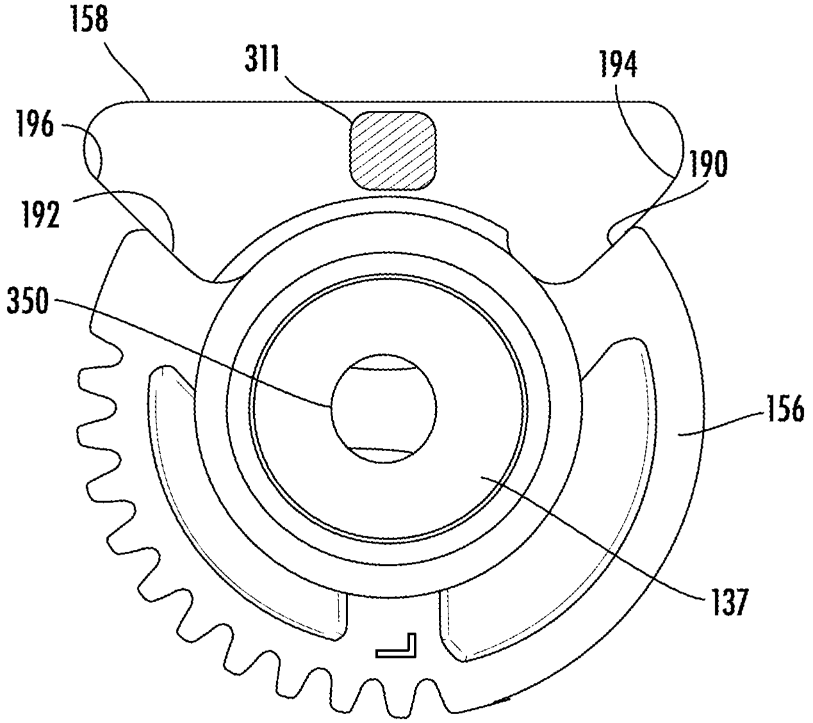
FIG. 31 is a top view of the spout gear of FIG. 28 in a second position and in a left-handed configuration.

FIGS. 23, 28, and 29 show a right-handed configuration (e.g., a first configuration) of the fixture 50 (e.g., where the spout assembly 300 is rotated to the left in the stored position). FIGS. 30 and 31 show a left-handed configuration (e.g., a second configuration) of the fixture 50 (e.g., where the spout assembly 300 is rotated to the right in the stored position). To reconfigure the fixture 50 into the left-handed configuration, the spout gear 156 may be removed, flipped over, and placed back onto the shaft 137. In such an arrangement the stop surface 190 may engage the stop protrusion 311 to limit rotation of the spout assembly 300 in a clockwise direction. Accordingly, the fixture 50 can be reconfigured between a right-handed configuration and a left-handed configuration by reorienting the spout gear 156. This requires no additional parts and minimal technical expertise.

In an alternative embodiment, the angle between the stop surface 190 and the stop surface 192 is smaller than the angle between the stop surface 194 and the stop surface 196. In such an embodiment, the stop surface 192 may limit rotation of the spout assembly 300 in the clockwise direction when the emergency wash arm 200 is in the stored position. In this configuration, the stored position of the spout assembly 300 may be outside of the range of active positions that the spout assembly 300 is able to access when the emergency wash arm 200 is in the stored position.

In alternative embodiments, any of the fluid channels (e.g., fluid channel 271) may be formed separately from the base 100. By way of example, one or more of the fluid channels may be formed using conduits (e.g., hoses, pipes, tubes, etc.) made from hard materials (e.g., acrylic or other plastic, copper or other metal, or glass) or soft materials (e.g., silicone, rubber, etc.).

In yet other alternative exemplary embodiments, flows of fluid through the emergency wash arm 200 and/or the spout 300 are otherwise controlled. For example, the hub 170 may have a different type of valve that replaces the disc valve 209. Additionally, the hub 170 may be shaped or positioned such that hub 170 does not control the flow of fluid to the spout assembly 300. Alternatively, the flow of fluid to the spout assembly 300 may be controlled by another valve external to the hub 170 (e.g., a manually operated valve). By way of example, fluid flow to the spout assembly 300 or the emergency wash arm 200 may be controlled by an electronically-actuated valve.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fixture as shown in the various exemplary embodiments is illustrative only. Additionally, any element disclosed in one embodiment may be incorporated or utilized with any other embodiment disclosed herein. For example, the facewash 250 of the exemplary embodiment shown in at least FIG. 11 may be incorporated in the fixture of the exemplary embodiment shown in at least FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A combination emergency wash and faucet unit, comprising:
- a base;
- an emergency wash arm pivotally coupled to the base, the emergency wash arm including an emergency wash unit, wherein the emergency wash arm is rotatable relative to the base about a first vertical axis between a stored position and an active position;
- a spout pivotally coupled to the base, wherein the spout is rotatable relative to the base about a second vertical axis, wherein the first vertical axis is substantially parallel to the second vertical axis and offset from the second vertical axis,
- wherein movement of the emergency wash arm causes a corresponding movement of the spout.

2. The combination emergency wash and faucet unit of claim 1, wherein the spout is movable between a stored position and an active position, and wherein the spout is permitted to move freely between the stored position of the spout and the active position of the spout when the emergency wash arm is in the stored position of the emergency wash arm.

3. The combination emergency wash and faucet unit of claim 1, wherein the spout is movable between a stored position and an active position, and wherein the spout is prevented from moving from the stored position of the spout to the active position of the spout when the emergency wash arm is in the active position of the emergency wash arm.

4. The combination emergency wash and faucet unit of claim 1, wherein moving the emergency wash arm from a stored position to an active position causes the corresponding movement of the spout.

5. The combination emergency wash and faucet unit of claim 1, further comprising a rotation control member rotationally coupling the spout and the emergency wash arm.

6. The combination emergency wash and faucet unit of claim 5, wherein the rotation control member is coupled to the emergency wash arm and rotatable relative to the base about the first vertical axis.

7. The combination emergency wash and faucet unit of claim 5, wherein the rotation control member is selectively rotationally coupled to the spout and rotatable relative to the base about the second vertical axis.

8. The combination emergency wash and faucet unit of claim 1, wherein the emergency wash unit is an eyewash or a combination eye/face wash.

9. The combination emergency wash and faucet unit of claim 1, wherein the emergency wash unit is a facewash.

10. A combination emergency wash and faucet unit, comprising:
- a base;
- an emergency wash arm pivotally coupled to the base, the emergency wash arm including an emergency wash unit;
- a spout coupled to the base;
- a stop repositionable relative to the base between a first stop position and a second stop position,
- wherein, when the stop is in the first stop position, the emergency wash arm is permitted to move away from the spout in a first direction, and the stop limits movement of the emergency wash arm in the first direction when the emergency wash arm reaches a first stored position; and
- wherein, when the stop is in the second stop position, the emergency wash arm is permitted to move away from the spout in a second direction opposite the first direction, and the stop limits movement of the emergency wash arm in the second direction when the emergency wash arm reaches a second stored position.

11. The combination emergency wash and faucet unit of claim 10, further comprising a rotation control member coupled to the emergency wash arm and movable relative to the base, the rotation control member defining a first stop surface that engages the stop when the emergency wash arm is in the first stored position and a second stop surface that engages the stop when the emergency wash arm is in the second stored position.

12. The combination emergency wash and faucet unit of claim 11, wherein the emergency wash arm is repositionable into an active position between the first stored position and the second stored position, and wherein at least one of:

when the stop is in the first stop position, the second stop surface engages the stop when the emergency wash arm is in the active position; or when the stop is in the second stop position, the first stop surface engages the stop when the emergency wash arm is in the active position.

13. The combination emergency wash and faucet unit of claim 10, wherein the stop is a pin.

14. The combination emergency wash and faucet unit of claim 10, wherein the base defines a first stop aperture and a second stop aperture each configured to receive the stop, and wherein the stop is repositionable by removing the stop from the first stop aperture and inserting the stop into the second stop aperture.

15. A combination emergency wash and faucet unit, comprising:

a base, comprising:

a main body; and a hub movably coupled to the main body and defining a control surface;

an emergency wash arm coupled to the hub, the emergency wash arm including an emergency wash unit;

a spout coupled to the main body; and a valve assembly coupled to the main body, the valve assembly including a valve element that controls a flow of a fluid through the spout, wherein the valve assembly engages the control surface, and wherein the control surface is shaped such that movement of the hub repositions the valve element to limit the flow of the fluid through the spout.

16. The combination emergency wash and faucet unit of claim 15, wherein the hub is rotatable relative to the main body about an axis of rotation, and wherein a distance between the control surface and the axis of rotation varies such that rotation of the hub repositions the valve element to limit the flow of the fluid through the spout.

17. The combination emergency wash and faucet unit of claim 16, wherein the valve element includes a spool that engages the control surface, wherein the spool is configured to translate along a spool passage that extends substantially perpendicular to the axis of rotation.

18. The combination emergency wash and faucet unit of claim 17, wherein the valve assembly further comprises a biasing member configured to apply a biasing force to bias the spool into engagement with the control surface.

19. The combination emergency wash and faucet unit of claim 16, wherein the axis of rotation is substantially vertical.

20. The combination emergency wash and faucet unit of claim 15, wherein the valve assembly is a first valve assembly and the fluid is a first fluid, further comprising a second valve assembly coupled to the main body and the hub, wherein the second valve assembly controls a flow of a second fluid through the emergency wash unit based on a position of the emergency wash arm.

* * * * *